US012743660B2

(12) United States Patent
Xing et al.

(10) Patent No.: US 12,743,660 B2
(45) Date of Patent: Sep. 22, 2026

(54) RANKED PRUNING OF DATA SET TO TRAIN MACHINE LEARNING MODELS

(71) Applicant: Meta Platforms, Inc., Menlo Park, CA (US)

(72) Inventors: Yue Xing, West Lafayette, IN (US); David Yan, Toronto (CA); Fei Wu, Union City, CA (US); Pamela Bhattacharya, Redmond, WA (US); Ashutosh Pandey, Sammamish, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 870 days.

(21) Appl. No.: 18/169,462

(22) Filed: Feb. 15, 2023

(65) Prior Publication Data

US 2024/0289680 A1 Aug. 29, 2024

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS 9,679,259 B1 6/2017 Frind et al.
11,556,742 B2 * 1/2023 Levanony .............. G06V 10/82
11,593,650 B2 * 2/2023 Zhang .................. G06N 3/0895
12,106,193 B2 * 10/2024 Alkan .................... G06N 5/046
12,271,443 B1 * 4/2025 Ardila .................... G06V 10/70
2015/0379428 A1 * 12/2015 Dirac ..................... G06N 20/00 706/12
2017/0082555 A1 * 3/2017 He ..................... G01N 21/9501
2019/0025917 A1 * 1/2019 Francis .................. A61B 5/375
2020/0097742 A1 * 3/2020 Ratnesh Kumar ........ G06T 1/20
2020/0387760 A1 * 12/2020 Kamdar .............. G06F 18/2411
2021/0146258 A1 * 5/2021 Pedersen ................ G06N 20/10
2022/0237208 A1 * 7/2022 Srinivasan ............ G06F 16/254
2022/0292309 A1 * 9/2022 Ashrafi ............... G06F 18/2148
2023/0128462 A1 * 4/2023 Hassan .................... G06N 5/01 726/23
2023/0139644 A1 * 5/2023 Ramsl ................... G06F 40/284 704/9

(Continued)

OTHER PUBLICATIONS

Northcutt et al., "Learning with Confident Examples: Rank Pruning for Robust Classification with Noisy Labels," Aug. 9, 2017, https://arxiv.org/abs/1705.01936.*

(Continued)

*Primary Examiner* — Ryan Barrett
(74) *Attorney, Agent, or Firm* — EVERSHEDS SUTHERLAND (US) LLP

(57) ABSTRACT

Systems, apparatuses and methods provide technology that identifies a plurality of data samples of a data set. In response to a trigger, the technology identifies a first subset of samples of the plurality of data samples that are outside a range associated with a decision boundary of a machine learning model, and removes the first subset of samples from the data set to generate a modified training set. The technology train the machine learning model based on the modified training set.

17 Claims, 11 Drawing Sheets

(56) References Cited

U.S. PATENT DOCUMENTS

| | | | | |
|---|---|---|---|---|
| 2023/0170071 | A1* | 6/2023 | Dardashti | G16H 40/63 705/2 |
| 2023/0244987 | A1* | 8/2023 | Truong | G06N 20/00 706/11 |
| 2024/0119349 | A1* | 4/2024 | Debnath | G06F 16/215 |
| 2024/0211798 | A1* | 6/2024 | Swaroop | G05B 19/41885 |

OTHER PUBLICATIONS

Fang Z., et al., "Confident Learning-Based Domain Adaptation for Hyperspectral Image Classification," IEEE Transactions on Geoscience and Remote Sensing, Apr. 12, 2022, vol. 60, 16 pages.

Kim Y., et al., "NLNL: Negative Learning for Noisy Labels," IEEE/CVF International Conference on Computer Vision, 2019, pp. 101-110.

Lian S., et al., "Rank Pruning Approach for Noisy Multi-Label Learning," IEEE International Conference on Systems, Man, and Cybernetics, Oct. 10, 2018, pp. 426-431.

* cited by examiner

RANKED PRUNING OF DATA SET TO TRAIN MACHINE LEARNING MODELS

BACKGROUND

Machine learning models may be trained based on training data. The machine learning models may execute an iterative training process to train the machine learning model based on the training data (e.g., via gradients). The training process may be extensive and consume a significant amount of computing resources to complete.

SUMMARY

A system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions.

One general aspect includes at least one computer readable storage medium comprising a set of instructions, which when executed by a computing device, cause the computing device to identify a plurality of data samples of a data set. The instructions, when executed, cause the computing device to, in response to a trigger, identify a first subset of samples of the plurality of data samples that are outside a range associated with a decision boundary of a machine learning model and remove the first subset of samples from the data set to generate a modified training set. The instructions, when executed, cause the computing device to train the machine learning model based on the modified training set.

Another general aspect includes a system comprising one or more processors, and a memory coupled to the one or more processors, the memory comprising instructions executable by the one or more processors, the one or more processors being operable when executing the instructions to identify a plurality of data samples of a data set. The one or more processors being operable when executing the instructions to, in response to a trigger, identify a first subset of samples of the plurality of data samples that are outside a range associated with a decision boundary of a machine learning model, and remove the first subset of samples from the data set to generate a modified training set. The one or more processors being operable when executing the instructions to train the neural network based on the modified training set.

Another general aspect includes a method comprising identifying a plurality of data samples of a data set. In response to a trigger, the method comprises identifying a first subset of samples of the plurality of data samples that are outside a range associated with a decision boundary of a neural network, and removing the first subset of samples from the data set to generate a modified training set. The method comprises training the neural network based on the modified training set.

BRIEF DESCRIPTION OF THE DRAWINGS

The various advantages of the examples will become apparent to one skilled in the art by reading the following specification and appended claims, and by referencing the following drawings, in which:

DESCRIPTION EXAMPLE

Figure 1A:
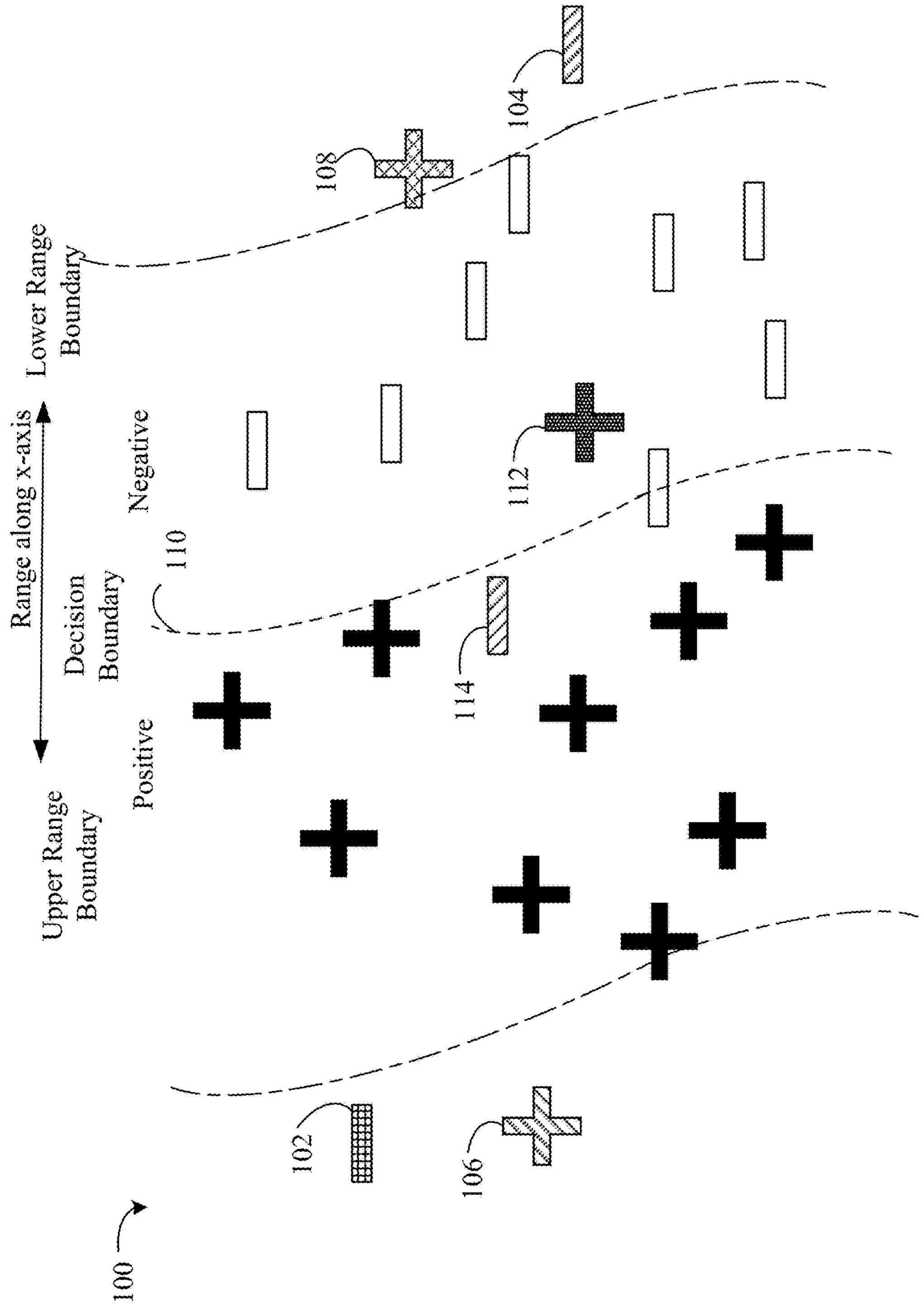
FIGS. 1A, 1B and 1C illustrate a training process that executes rank pruning according to an example of the disclosure.

Inaccurate labels in training data are a common problem in machine learning. For example, data sets for training may have samples with label noise. A sample with label noise may be a sample that is classified by a machine learning model as being far and/or distal from the decision boundary but is mis-labelled (e.g., by a human operator). For example, noisy labels, may be randomly reversed (mis-labeled) with respect to the ground truth despite classes being well separated and easily identified. Such a phenomenon is labelled as noise where the same reviewer may label a same sample differently (e.g., as positive or negative) when presented multiple times with the same sample. Training machine learning models on such samples may cause sub-optimal and poor model performance.

In many real applications (e.g., fraud detection, classification, etc.), there exist samples around the decision boundary that may be inherently difficult to label, leading to erroneous labels. Such samples (which are at the decision boundary) are important for model training because of the high learning value. Existing pruning algorithm do not differentiate between samples with label noise and erroneous labels, and therefore prunes both kinds of samples.

That is, for many applications, in addition to noisy training samples, there may be samples that are difficult to categorize, and have inaccurate labels. Such samples are close to the decision boundary. Samples proximate to the decision boundary may have inaccurate labels because the labeling decision is naturally more challenging. Consequently, the same sample is labeled as positive by some reviewers and negative by the others. Such a phenomenon is referred to as label errors (e.g., erroneous labels) and/or between-person noise. Such samples (e.g., erroneous samples) that are proximate to (e.g., close and within a range) of the decision boundary should not be pruned because such samples facilitate training a trained model to learn the decision boundary. Existing pruning processes may prune noisy samples and erroneous samples because such pruning processes do not differentiate between label noise and errors when pruning (e.g., potentially suspicious/inaccurately labelled samples).

Thus, examples as described herein enhance existing pruning systems in several ways. Firstly, examples do not prune all the suspicious samples, particularly the suspicious samples close to the decision boundary that have a high learning value. Rather, examples herein prune (e.g., remove from the training process) high-confidence samples (e.g., confidence samples which may inherently have less learning value) and noisy samples (e.g., samples that are correctly classified by a machine learning model as being far and/or distal from the decision boundary but are incorrectly labelled by a human operator). Notably, examples herein do not prune all suspicious samples (e.g., erroneous and noisy samples), particularly the suspicious samples that are close to the decision boundary and therefore have a high learning value. Confident samples may be samples which may be classified with high accuracy by a trained machine learning model (e.g., an accuracy is above a threshold).

Secondly, examples preserve samples which may potentially have label errors but have a high learning value. To do so, some examples generate accurate labels for the preserved samples through a multiple review process. Examples herein further adjust and learn hyperparameters (using the training data) to distinguish between noisy and erroneous samples such that samples with high-learning value are not pruned.

To accomplish the above, examples identify a plurality of data samples of a data set. In response to a trigger (e.g., an accuracy of a machine learning model meeting a threshold), examples identify a first subset of samples of the plurality of data samples (e.g., confident samples and noisy samples) that are outside a range of a decision boundary of a machine learning model, and removes the first subset of samples from the data set to generate a modified training set. Examples train the machine learning model based on the modified training set. Doing so enhances the ability of the machine learning model to focus training on features which are more closely centered around the decision boundary to enable the machine learning model to learn fine classification centered around the decision boundary with greater accuracy. Furthermore, doing so is a specific way to transform applications from describing a result to a way to achieve enhanced learning.

Additionally, some examples exhibit that the performance of the enhanced rank pruning process may be further enhanced as the erroneous sample count decreases in the training data as iterations of training progresses and erroneous samples are identified and re-labelled with a multi-review training process. To reduce erroneous samples, each erroneous sample is labeled by multiple reviewers, and a majority vote determines the final label. Examples have shown that flagging and executing such a multi-labeling approach reduces erroneous samples by canceling the individual level of errors.

That is, existing implementations that are trained on training data with inaccurate labels is a challenge when building high-quality machine learning models and prevents models from generalizing well to unseen data. A low-quality model may have negative consequences for a domain such as integrity on a social media platform, where false negatives or false positives can eventually lead to users leaving the platform. For example, some social media platforms may attempt to implement safety procedures to remove nefarious actors, such as a scammers. If the machine learning model misses a nefarious actor, innocent and productive users of the social medial platform may be affected and cause financial harm to good users. Furthermore, if the machine learning is trained to be too aggressive, an innocent user may be banned by the model and lead to poor user experience. In both cases, innocent and productive users will be discouraged from engaging with the social media platforms.

Figure 1B:
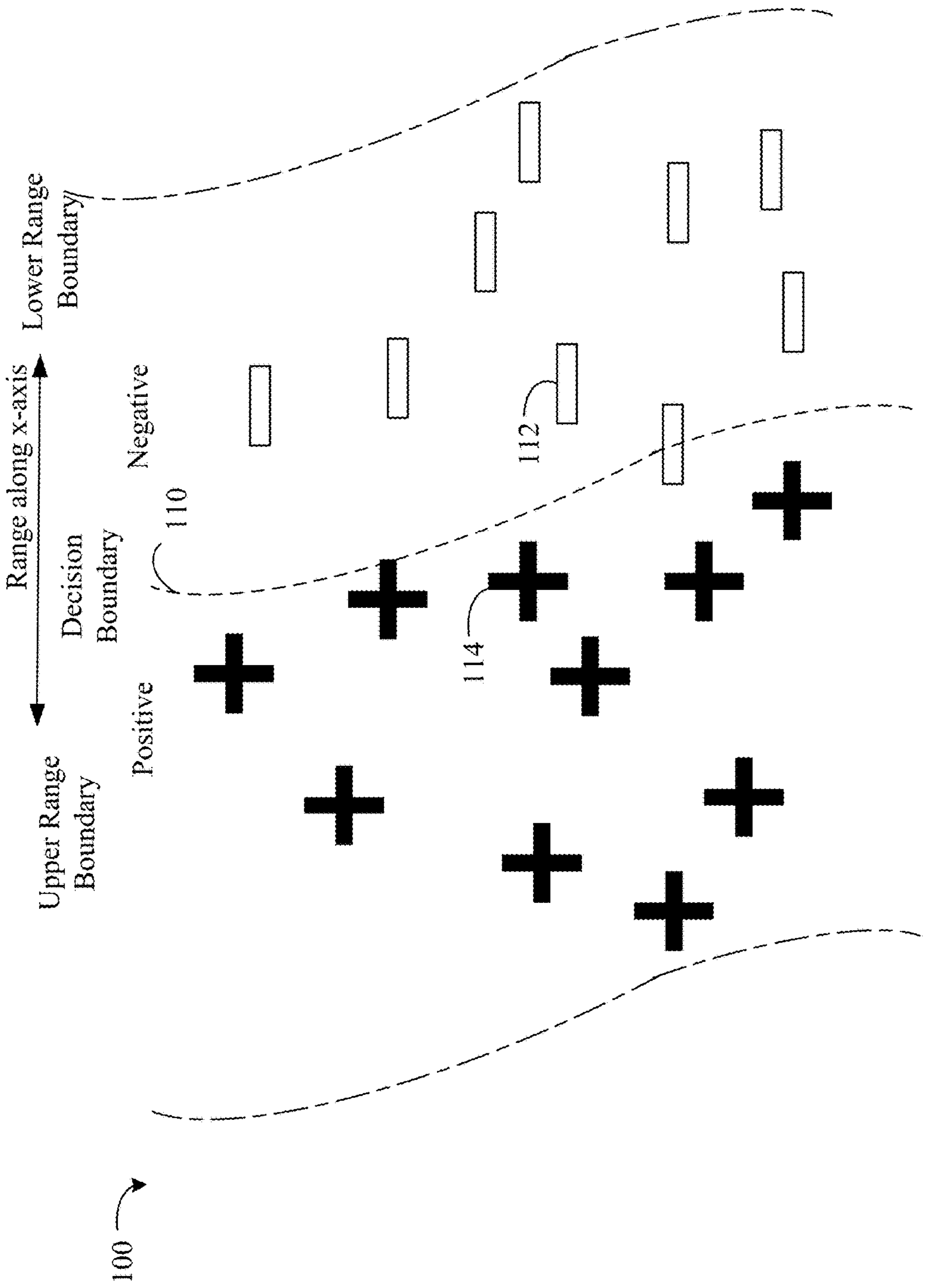
Figure 1C:
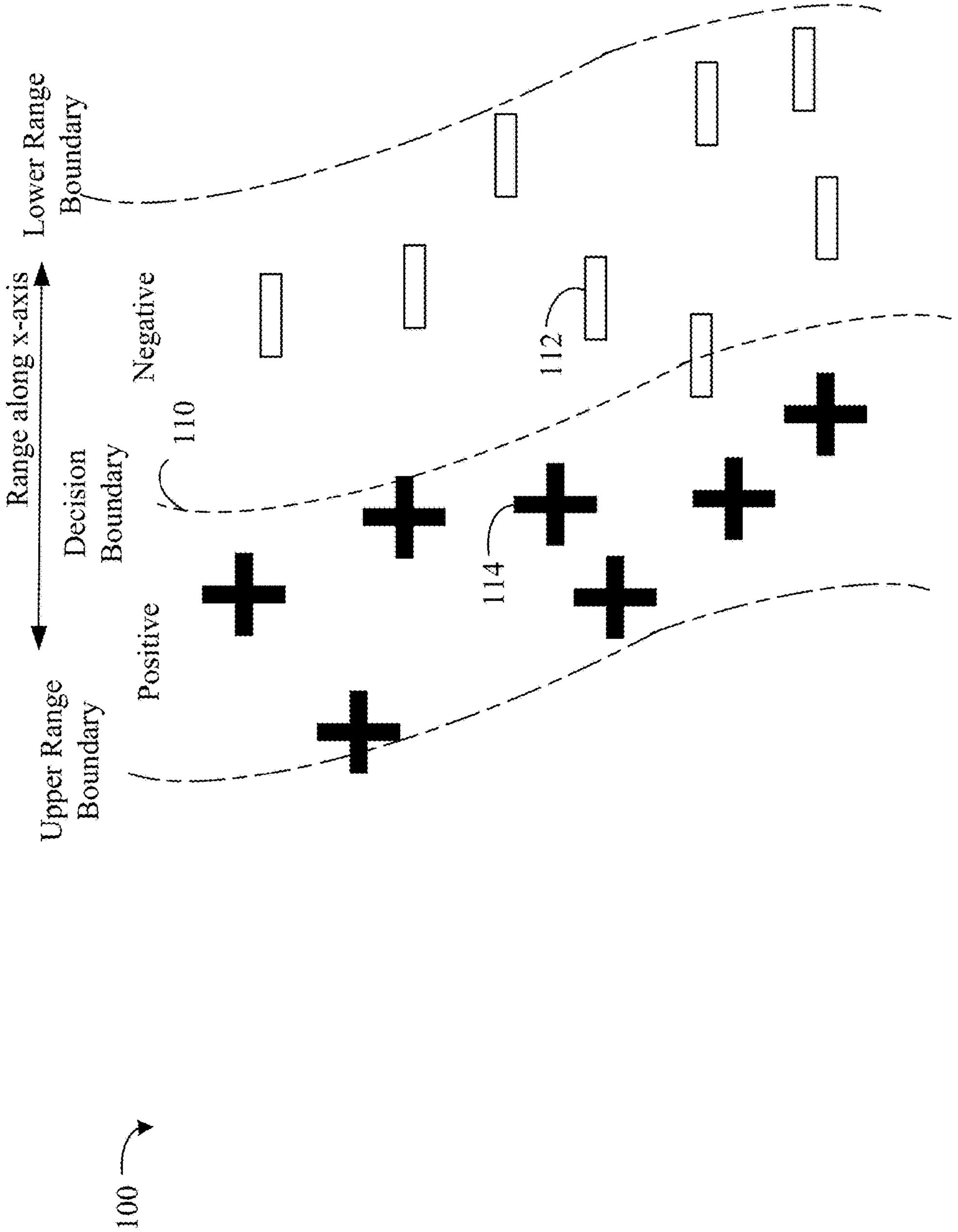

Turning now to FIGS. 1A-1C, a training process 100 executes iterative training (e.g., multiple iterations) with a sample pruning process. A machine learning model (e.g., neural network) may be trained on a training set illustrated in FIG. 1A. As will be discussed below, samples of the training set (e.g., training data set) are pruned throughout the training focus to shift the training of the machine learning model to learn various features of the training set (e.g., samples being represented with positive and negative signs). The machine learning model and/or training process 100 may be implemented with a networked computing architecture. The machine learning model and/or training process 100 may be implemented in a computing device including a memory and processor, computing system (e.g., hardware, configurable logic, fixed-function logic hardware, at least one computer readable storage medium comprising a set of instructions for execution, etc.).

As illustrated, the training set includes a plurality of samples that comprise the training set. The plurality of samples is represented with minus signs (e.g., indicating that the sample is labeled as a negative sample such as not a scammer) and positive sign (e.g., indicating that the sample is labeled as a positive sample such as is a scammer). While positive or negative labels are described, it will be understood that different labels may be used (e.g., cat label or dog label, a male label or female label, etc.).

A decision boundary 110 is further illustrated. The decision boundary 110 separates the samples as data-points into regions, which are actually the classes in which the machine learning model classifies samples. The decision boundary 110 is the boundary to classify the data-points in a feature space into various classes. In FIGS. 1A-1C, the positive samples are generally classified by the machine learning model as being in the positive feature space by some margin. For example, the classification may not be binary in nature, but rather may reflect a series of values that are used to classify the sample. In this example, the values may be from 0-1, where a higher value (e.g., estimated probability) indicates the higher probability of a label being positive. Thus, a value of approximately zero would indicate a classification of the probability that the sample is negative being 100%, while a value of approximately one would indicate a classification of the probability that the sample is positive being 100%. A value of 0.5 would indicate a 50% probability that the sample is negative, and a 50% chance that the sample is positive, and so on. The samples are arranged along the x-axis with the x-axis being the values 0-1 (e.g., probability values) with 0.5 being approximately centered on the decision boundary 110. The decision boundary 110 may change position. The y-axis (not illustrated but may extend vertically and perpendicular to the x-axis) may correspond to an order that the samples are processed. The decision boundary 110 by the machine learning model and the actual data model may be non-linear. Examples are not restricted to linear models.

Samples outside of a range, which is centered around the decision boundary 110, may have a lower learning value for the machine learning model. The range extends from an upper range boundary and a lower range boundary, with the decision boundary 110 being in the middle of the range. Samples within the range (denoted as being between the upper range boundary and the lower range boundary) have a higher learning value for the machine learning model to learn how to classify samples that are proximate (e.g., difficult to classify samples that may be interpreted as being positive or negative) to the decision boundary 110.

Suspicious samples include samples with random noise in which labels and trained model prediction differ by a significant margin (e.g., a negative sample with a model prediction being a prediction score of 0.95). As noted above, a prediction score of a model prediction varies between 0 and 1 such that a higher value indicates higher chances of a label being positive.

In this example, a first random noise sample 102 is labeled as being negative (indicated by the "minus sign") but the machine learning model classifies and/or predicts the first random noise sample 102 to be positive with a high probability (e.g., a score of 0.9 or 80% chance of being positive). Thus, the classification of the machine learning model (high probability of being positive) does not match the label (negative). Furthermore, the probability of the first random noise sample 102 being positive is above a positive threshold and/or outside the range (e.g., exceeds the upper range boundary) meaning that the first random noise sample 102 is not proximate to the decision boundary 110 and is instead distal to of the decision boundary 110. As noted above, samples outside of a proximity of the decision boundary 110 (which are indicated as being outside of the range) may have lower learning values. Thus, examples determine that the first random noise sample 102 is random noise, and has a lower learning value.

Further, a second random noise sample 108 is labeled as being positive (indicated by the "positive sign") but the machine learning model classifies and/or predicts the second random noise sample 108 to be negative with a high probability (e.g., a score of 0.1 or 80% chance of being negative). Thus, the classification of the machine learning model (high probability of being negative) does not match the label (positive). Furthermore, the machine learning model assigns a probability of the second random noise sample 108 being positive, where the probability is below a negative threshold and/or outside of the range. That is, the second random noise sample 108 is not proximate to the decision boundary 110 and is instead distal to the decision boundary 110. As noted above, samples that are distal to the decision boundary 110 (which are indicated as being outside of the range of the boundary) may have lower learning values. Thus, examples determine that the second random noise sample 108 is random noise, and has a lower learning value.

Confident samples refer to those samples whose model predictions may achieve a high accuracy (e.g. a negative sample with a prediction score of 0.05). For example, a first confident sample 106 is labeled as being positive (indicated by the "positive sign") and the machine learning model classifies and/or predicts the first confident sample 106 to be positive with a high probability (e.g., a score of 0.95 or 90% chance of being positive). Thus, the classification of the machine learning model (high probability of being positive) does match the label (positive). Furthermore, the probability that the first confident sample 106 is above the positive threshold and/or the range denoted by the upper range boundary meaning that the first confident sample 106 is not proximate to the decision boundary 110 and is instead distal to of the decision boundary 110. As noted above, samples outside of a proximity of the decision boundary 110, which are indicated as being outside of the range, may have lower learning values. Thus, examples determine that first confident sample 106 is a confident sample outside of the range of the decision boundary 110, and has a lower learning value.

A second confident sample 104 is labeled as being negative (indicated by the "negative sign") and the machine learning model classifies and/or predicts the second confident sample 104 to be negative with a high probability (e.g., a score of 0.05 or 90% chance of being positive). Thus, the classification of the machine learning model (high probability of being negative) does match the label (negative). Furthermore, the probability (e.g., machine learning model score) is below the negative threshold and/or outside the range denoted by the lower range boundary meaning that the second confident sample 104 is not proximate to the decision boundary 110 and is instead distal to of the decision boundary 110. As noted above, samples outside of the proximity of the decision boundary 110, which are indicated as being outside of the range of the decision boundary 110, may have lower learning values. Thus, examples determine that second confident sample 104 is a confident sample outside of the range of the decision boundary 110, and has a lower learning value.

Notably, the machine learning model identifies that some samples are erroneous. That is, a first erroneous sample 112 is identified as being erroneous based on the first erroneous sample 112 being proximate to (e.g., close and within the range) of the decision boundary 110 as well as misclassification. That is, the first erroneous sample 112 further is predicted to be negative by a small amount (e.g., 0.45 or 10% chance of being negative) but is labeled as being positive. Thus, the prediction (e.g., classification) of the machine learning model does not match the label assigned to the first erroneous sample 112. Since the first erroneous sample 112 is within the range of the decision boundary 110 and thus has a higher learning value, the first erroneous sample 112 should not be pruned because such samples facilitate training a trained model to learn the decision boundary 110.

Furthermore, a second erroneous sample 114 is identified as being erroneous based on the second erroneous sample 114 being proximate to (e.g., close and within the range) of the decision boundary 110 as well as misclassification (described in the following). That is, the second erroneous sample 114 further is predicted to be positive by a small amount (e.g., 0.55 or 10% chance of being negative) but is labeled as being negative. Thus, the prediction (e.g., classification) of the machine learning model does not match the label assigned to the second erroneous sample 114. Since the second erroneous sample 114 is within the range of the decision boundary 110 and thus has a higher learning value, the second erroneous sample 114 should not be pruned because such samples facilitate training a trained model to learn the decision boundary 110.

A machine learning model may train based on all the samples illustrated in FIG. 1A during a first iteration of training (e.g., process a set of samples with the neural network). The process 100 may determine an accuracy of the machine learning model during the processing of the samples, and set a trigger based on the accuracy exceeding a first threshold. If the accuracy is below the accuracy first threshold, the trigger is not set. When the trigger is set, rank pruning of the samples may be executed. Rank pruning will remove samples from the training set so that the machine learning model may focus on learning specific classifications in more detail, such as classifying samples near the decision boundary 110.

In this example, the rank pruning removes first confident sample 106, the second confident sample 104, the first random noise sample 102 and the second random noise sample 108. That is, and as noted above, the first confident sample 106, the second confident sample 104, the first random noise sample 102 and the second random noise sample 108 have little learning value with respect to learning classification proximate to the decision boundary 110. As such, to enable the machine learning to learn the decision boundary 110, samples which are proximate to the decision boundary 110 (e.g., within the upper range boundary and the lower range boundary) or closer to the decision boundary 110 than the first confident sample 106 and the second confident sample 104 are retained while samples that are distal to the decision boundary 110 are removed. Thus, examples prune some samples so that the other samples will be those which are on average closer to the decision boundary 110 remain. Training may then focus more on learning the decision boundary 110 more closely.

Thus, examples generate a modified training set as illustrated in FIG. 1B. in some examples, some confident samples outside the range are retained while outlying confident samples, such as the first confident sample 106 and the second confident sample 104, are removed.

In some examples, a multi-review process is executed to correctly label first and second erroneous samples 114, 112. That is, to reduce erroneous samples, each sample is labeled by multiple reviewers (or automatically labeled with different software labelling programs), and a majority vote decides the final label. Such a labeling approach helps reduce erroneous samples by canceling the individual level of error. Such a multi-review process may be executed on samples classified as being erroneous while bypassing non-erroneous samples.

In FIG. 1B, the first confident sample 106, the second confident sample 104, the first random noise sample 102 and the second random noise sample 108 are removed so that the machine learning model may focus on training on samples closer to the decision boundary 110. Not all samples outside the range of the decision boundary 110 are removed so that the machine learning model continues to learn to classify samples outside the range. Furthermore, the multi-review process is executed on the first and second erroneous samples 112, 114 to correctly re-label the first and second erroneous samples 112, 114.

As the accuracy of the machine learning model increases, hyperparameters may be correspondingly adjusted (e.g., automatically or by a human operator) so that further samples are pruned. For example, the number of confident samples that are removed may increase to remove samples that are outside the range while retaining samples within the range. That is, some examples may bypass a first sample of the plurality of samples from being removed based on a classification probability of the first sample being within the range of the decision boundary 110.

Thus, when the accuracy of the machine learning model reaches a second threshold, the parameters may be adjusted to aggressively remove further samples. Thus, samples outside of the range are removed, resulting in the further modified training set illustrated in FIG. 1C. Thus, the machine learning model may focus learning to classifying samples near the decision boundary 110.

As such, the training set is modified to focus training throughout the training process 100. It is worthwhile to note that training process 100 generates more robust machine learning models than existing examples due to the ability of the robust machine learning models to accurately classify samples clustered near the decision boundary 110, which may be difficult or impossible for existing machine learning models. Thus, implementations described herein are deeply rooted in computer technology (e.g., machine learning models processing data) and solve problems particular to computing architectures (e.g., facilitating a machine learning model classifying samples near decision boundaries). The machine learning model may be a neural network, deep learning model, feed forward neural network, multilayer perceptron, convolutional neural network, etc.

To further facilitate the discussion of the training process 100, consider binary classification to classify samples to have values between 0 and 1. The scenario of erroneous labeling is considered as follows. Denote the ground-truth probability as follows in Equation 1:

$$g_0(x) := P(Y = 1 \mid X = x) \text{ for } x \text{ in the support } D \quad \text{Equation 1}$$

The ground truth probability is further defined by the Bayes classifier of Equation 2:

$$f_0(x) = 1\{g_0(x) > 1/2\} \quad \text{Equation 2}$$

Mathematically, label error refers to the case where $g_0$ takes values other than 0 or 1.

In terms of label noise, instead of observing the true label Y, we observe a perturbed label Z, where the flipping probabilities are denoted by Equations 3 and 4 below for some constants $\rho_0$, $\rho_1>0$ which are independent of x:

$$P(Z = 1 \mid Y = 0) = \rho_0 \quad \text{Equation 3}$$

$$P(Z = 0 \mid Y = 1) = p_1 \quad \text{Equation 4}$$

The flipping of labels with probabilities ($\rho_0$, $\rho_1$) is what is referred to as label errors. Examples further denote g(x) as follows in Equation 5:

$$g(x) := P(Z = 1 \mid X = x) \quad \text{Equation 5}$$

Additionally examples define the probability of Z being 1 as in Equation 6:

$$p_z 1 = P(Z = 1) \quad \text{Equation 6}$$

The conditional probability of the hidden true label Y given the observed label Z is as follows:

$$\pi_1 = P(Y = 0 \mid Z = 1) \quad \text{Equation 7}$$

$$\pi_0 = P(Y = 1 \mid Z = 0) \quad \text{Equation 8}$$

Obtaining the ground-truth $g_0$ or the perturbed version g may be challenging. Thus, examples obtain estimated model score g to estimate g from the noisy training data. Examples denote:

$$\Delta g(x) = \hat{g}(x) - g(x) \quad \text{Equation 9}$$

When the true label is noiseless, (i.e., $Y=f_0(x)$), examples may obtain an accurate estimate of $\pi_0$ and $\pi_1$ even when the labels are flipped. In examples, when observing an incorrect model prediction, the incorrect model prediction may be either caused by $Y/=f_0(x)$ (label error) or $Z/=Y$ (e.g., label noise), and therefore, one cannot identify the samples high learning value from such quantities. The probabilities may mean the probability of Z=1 or 0 given a current observation X=x. To ascertain the probabilities in detail, when observing a label Z, the following Equation 10 may be applied:

$$P(Z=1 \mid X=x) = P(Z=1 \mid Y=1, X=x) \times P(Y=1 \mid X=x) + P(Z=1 \mid Y=0, X=x) \times P(Y=0 \mid X=x) = (1-\rho_1)g_0(x) + \rho_0(1-g_0(x)), \quad \text{Equation 10}$$

Similarly, Equation 11 may ascertain the probabilities:

$$P(Z=0 \mid X=x) = (1-\rho_0)(1-g_0(x)) + \rho_1 g_0(x) \quad \text{Equation 11}$$

When $g_0 \in \{0, 1\}$ (e.g., no label error), P(Z=1|X=x) may take values in $\rho_0$ and $1-\rho_1$, both of which are not related to x. An unknown parameters are $\rho_0$, $\rho_1$). $\rho_0$, $\rho_1$) may be estimated with rank pruning for $\tilde{P}\tilde{N}$ learning. $\tilde{P}\tilde{N}$ learning is a problem of binary classification when training examples may be mislabeled (flipped) uniformly with noise rate pi for positive examples and $\rho_0$ for negative examples. Rank pruning solves $\tilde{P}\tilde{N}$ learning and the open problem of estimating the noise rates (e.g., the fraction of wrong positive and negative labels.

When $g_0 \in [0, 1]$ and changes as a function of x, estimating $\rho_0$, $\rho_1$) may become more difficult. When $f_0(x)=1$ $\{g_0(x) \geq 0.5\}=0$ but Z=1 is observed, such a situation may be caused by either a label noise (Y=0, Z=1) or label error (Y=1, Z=1). Examples still aim to prune samples with label noise.

To facilitate the above, instead of pruning all suspicious samples (i.e., $\pi_1$ negative samples and $\pi_0$ positive samples) based on rank pruning to solve $\tilde{P}\tilde{N}$ learning, examples may prune less suspicious samples. Samples with label error are likely to have a prediction score around 0.5 because a ground-truth score $g_0$ is around 0.5. Samples with label error tend to have less extreme prediction values. As a result, if examples pruned less suspicious samples, the remaining samples, (e.g., the samples that are not pruned), are more likely to be with label error.

As will be described below, algorithm 1 is a main algorithm to execute the training process 100, and algorithm 2 is for executing the rank pruning. While training a machine learning model using an iterative algorithm, if the accuracy identified by algorithm 1 is sufficient, examples may implement algorithm 2 to prune the suspicious and confident samples.

Algorithm 1

```
Input: Training data, number of iterations T, other parameters in the base algorithm.
  for t = 1 to T do
    Calculate the predicted score for each sample.
    Calculate the gradient (and Hessian if applicable).
    Calculate the accuracy A_cct of the current batch.
    if A_cct > θ then
        Use the rank-pruning algorithm 2 with ( α , β ) to remove samples
      in the current iteration.
    end if
    Update the model using the gradient (and Hessian if applicable).
end for
Output: Output model.
```

In algorithm 1, for each iteration of a certain number of iterations (e.g., from t=1 to T) examples calculate the predicted score, calculates the gradient (and Hessian if applicable) and calculates the accuracy $A_{cct}$ of the current batch (e.g., an accuracy score quantifying how well the machine learning model classified each sample). If the accuracy $A_{cct}$ is above a threshold (denoted $\theta$) then the rank-pruning algorithm (e.g., algorithm 2) with ($\alpha$, $\beta$) executes to remove samples in the current iteration. Regardless of the accuracy $A_{cct}$, the machine learning model is updated using the gradient (and Hessian if applicable). After all the iterations have completed, the final model is output.

The full algorithm of rank pruning (e.g., rank-pruning algorithm with ($\alpha$, $\beta$) in Algorithm 1) is described in Algorithm 2:

Algorithm 2

Input: Training data, suspicious threshold rate a, confident threshold rate ß, the predicted score function at iteration t gt. Denote P and N as the set of samples with positive/negative labels respectively. Take $p_{z1} = |P|/(|P| + |N|)$ as the proportion of the positive Z in the data set.

Calculate $$LB_{y=1} = \mathbb{E}_{x \in P}[g_t(x)],\ UB_{y=0} = \mathbb{E}_{x \in N}[g_t(x)].$$

Further split N and P by the model score, i.e., calculate $N_{y=1,t} = \{x \in N \mid g_t(x) \geq LB_{y=1}\}$ $P_{y=1,t} = \{x \in P \mid g_t(x) \geq LB_{y=1}\}$ $N_{y=0,t} = \{x \in N \mid g_t(x) \leq UB_{y=0}\}$ $P_{y=0,t} = \{x \in P \mid g_t(x) \leq UB_{y=0}\}$ Construct the estimate of P(Z = 0 | Y = 1) and P(Z = 1 | Y = 0) ($\rho_1$ and $\rho_0$) for this ith iteration via $$\hat{\rho}_{1,t} = \frac{|N_{y=1,t}|}{|N_{y=1,t}| + |P_{y=1,t}|},\ \hat{\rho}_{0,t} = \frac{|P_{y=0,t}|}{|P_{y=0,t}| + |N_{y=0,t}|} \quad (1)$$

Construct the estimate of P(Y = 0 | Z = 1) and P(Y = 1 | Z = 0) ($\pi_1$ and $\pi_0$) for this ith iteration via $$\hat{\pi}_{1,t} = \frac{\hat{\rho}_{0,t}}{p_{z1}} \frac{1 - p_{z1} - \hat{\rho}_{1,t}}{1 - \hat{\rho}_{1,t} - \hat{\rho}_{0,t}},\ \hat{\pi}_{0,t} = \frac{\hat{\rho}_{1,t}}{p_{z1}} \frac{p_{,t} - \hat{\rho}_{0,t}}{1 - \hat{\rho}_{1,t} - \hat{\rho}_{0,t}}. \quad (2)$$

Remove suspicious samples: Remove $\alpha\hat{\pi}_{1,t}|P|$ sample in P with the least $g_t$. Remove $\alpha\hat{\pi}_{0,t}|N|$ samples in N with the largest $g_t$.

Remove samples with less information: Remove $\beta(1-\hat{\pi}_{1,t})|P|$ samples in P with the largest $g_t$. Remove $\beta(1-\hat{\pi}_{0,t})|N|$ samples in N with the least $g_t$.

Denote $n_{p,t}$ and $n_{n,t}$ as the number of remaining samples in the batch. Take weight $W_{p,t}$ and $W_{n,t}$ for the remaining positive/negative samples so that $n_{p,t} w_{p,t}/(n_{n,t} w_{n,t}) = |P|/|N|$.

Output: Samples which will be removed.

Examples classify each sample into one of four categories based on the machine learning model score and the label (positive samples with high scores, positive samples with low scores, negative samples with high scores, negative samples with low scores), and calculate $\hat{\rho}_{1,t}$, $\hat{\rho}_{0,t}$, $\hat{\pi}_{1,t}$, and $\hat{\pi}_{0,t}$ to estimate $P(Y=0|Z=1)$ and $P(Y=1|Z=0)$. Based on the estimations, examples order positive and negative samples respectively based on the model scores, and prune the positive samples with smallest model scores (indicating a negative sample) and the negative samples with largest model scores (indicating a positive sample).

In Algorithm 2, it is intuitive to construct the estimate of $\rho_0$ and $\rho_1$ as in line (1) of Algorithm 2. Rather than pruning all $\hat{\pi}_{1,t}|\tilde{P}_t|$ positive samples with small scores and $\hat{\pi}_{0,t}|\tilde{N}_t|$ negative samples with large scores, examples may take the pruning rate as $\alpha\hat{\pi}_{1,t}(\alpha\hat{\pi}_{0,t})$ for some $\alpha \in (0, 1)$ determined by hyper-parameter tuning methods (e.g., cross validation, and/or Bayes approaches, etc.). When $\hat{g}$/=g or the data distribution involves label error, $\hat{\pi}_{1,t}$ and $\hat{\pi}_{0,t}$ are the upper bound of the true corruption ratios $P(Y=0|Z=1)$ and $P(Y=1|Z=0)$, rather than an exact estimate of them.

As noted, examples prune for confident samples. The data around the decision boundary 110 may facilitate the machine learning model learning with greater accuracy, so removing confident samples may also facilitate the machine learning model focusing learning efforts around the decision boundary 110.

In Algorithm 2, and differently from the suspicious samples in which examples seek to prune all samples with label noise, examples may not prune all confident samples because the confident samples provide important information to train the machine learning model. In the experiments, we use hyper-parameter tuning to select the best $\beta$(e.g., confident threshold rate), which in turn selects a number of the confidence samples to prune.

As noted above, the proposed method involves $(\alpha, \beta)$. Further, examples estimate of $(\pi_0, \pi_1)$ instead of directly pruning a n samples with random noise and $\beta$n confident samples. There are at least two reasons for doing so. First, although it may be possible to directly tune $\alpha$ and $\beta$ without considering $(\pi_0, \pi_1)$, the existence of $(\pi_0, \pi_1)$ simplifies the tuning of $(\alpha, \beta)$ and examples may search in [0, 1]. Second, the estimation of $(\pi_0, \pi_1)$ is robust which may further ensure the robustness of examples described herein.

Figure 2:
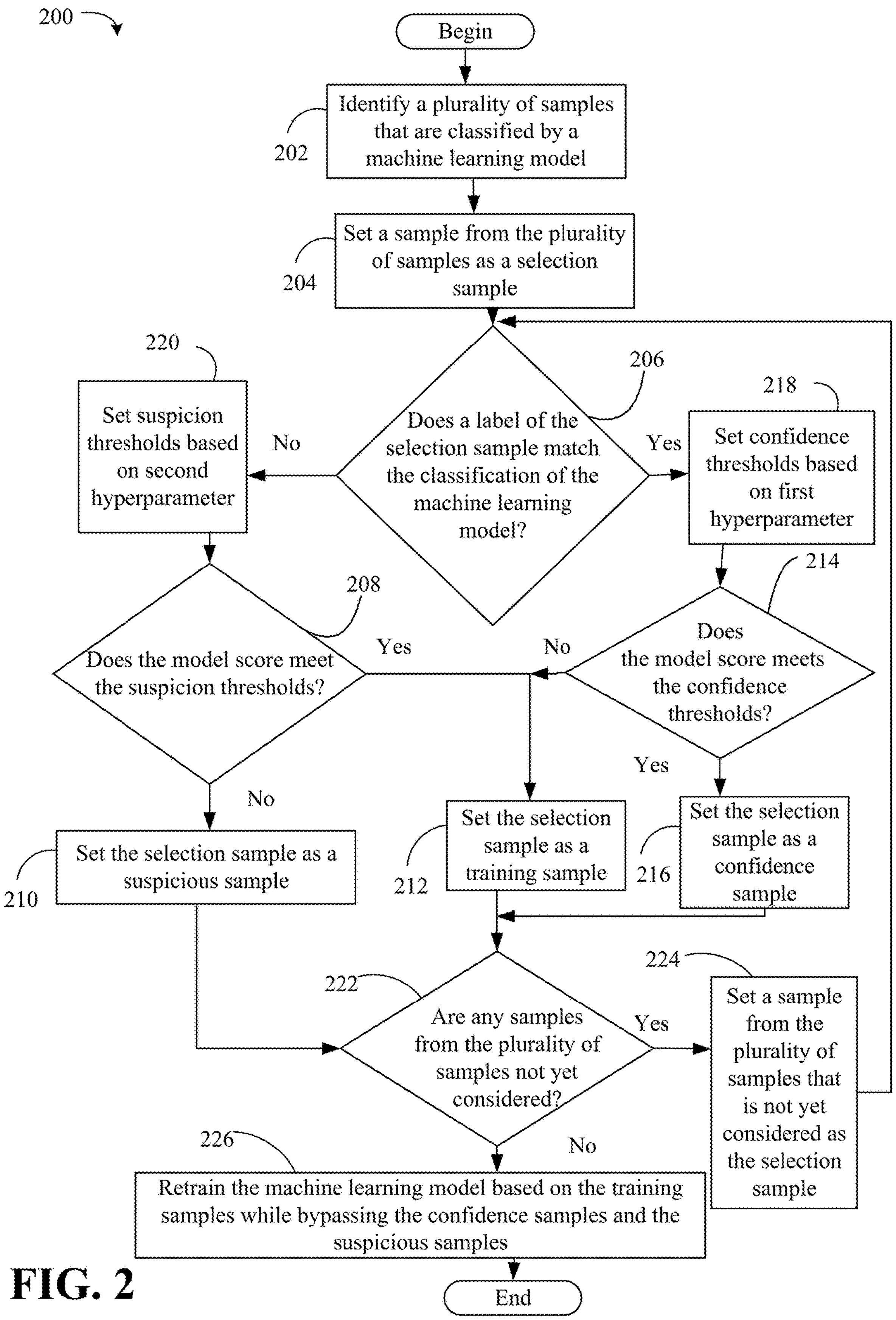
FIG. 2 is a flowchart of an example of a method to prune samples and train a machine learning model according to an example of the disclosure.

FIG. 2 illustrates a method 200 to prune samples and train a machine learning model (e.g., neural network). One or more aspects of method 200 may be implemented as part of and/or in conjunction with the training process 100 (FIGS. 1A, 1B and 1C). Method 200 may be implemented in a computing device, computing system (e.g., hardware, configurable logic, fixed-function logic hardware, at least one computer readable storage medium comprising a set of instructions for execution, etc.).

Illustrated processing block 202 identifies a plurality of samples that are classified by a machine learning model. For example, the machine learning model may process (e.g., classify) the plurality of samples during an iteration of a training process. Illustrated processing block 204 sets a sample from the plurality of samples as a selection sample. Illustrated processing block 206 determines if a label of the selection sample matches the classification by the machine learning model (e.g., if the classification probability or model score corresponds to the label). For example, the label may match the classification when a model score of the classification indicates that the sample is likely a value (e.g., dog, cat, etc.) of the label.

If so, illustrated processing block 218 sets a confidence threshold based on a first hyperparameter. The first hyperparameter may be adjusted throughout the training process and on the accuracy of the machine learning model. The confidence thresholds may be adjusted to the upper range boundary (FIGS. 1A-1C) and the lower range boundary (FIGS. 1A-1C). It also bears note that the confidence threshold may be adjusted based on the first hyperparameter to more aggressively remove confident samples as the accuracy of the machine learning model increases. For example, the confidence thresholds may approach a decision boundary of the machine learning model based on the first hyperparameter (e.g., upper range boundary may be decreased to approach the decision boundary and/or lower range boundary may be increased to approach the decision boundary to shrink how many samples are retained) to remove more confident samples as accuracy of the machine learning model increases.

Illustrated processing block 214 determines if the model score of the selection sample meets the confidence thresholds (e.g., model exceeds the upper range boundary or is less than the lower range boundary and/or is not between the confidence thresholds). If not, the sample is proximate the decision boundary and illustrated processing block 212 sets the selection sample as a training sample. Otherwise, illustrated processing block 216 sets the selection sample as a confidence sample that is distal to the decision boundary which may be pruned.

If processing block 206 determines that the label of the selection sample does not match the classification of the machine learning model, illustrated processing block 220 sets suspicion thresholds based on a second hyperparameter. For example, the suspicion thresholds may be adjusted to the upper range boundary (FIGS. 1A-1C) and the lower range boundary (FIGS. 1A-1C). It also bears note that the threshold may be adjusted based on the second hyperparameter to more aggressively remove suspicious samples as the accuracy of the machine learning model increases. For example, the suspicion thresholds may approach a decision boundary based on the second hyperparameter (e.g., upper range boundary may be decreased to approach the decision boundary and/or lower range boundary may be increased to approach the decision boundary) to remove samples. Furthermore, the suspicion thresholds may not match the confidence thresholds such that confidence samples and suspicion samples are pruned at different rates and/or times.

Illustrated processing block 208 determines if the model score meets the suspicion threshold (e.g., exceeds the upper range boundary or is less than the lower range boundary). If not, illustrated processing block 212 sets the selection sample as a training sample. Otherwise, illustrated processing block 210 sets the selection sample as a suspicious sample, which may be pruned.

Illustrated processing block 222 determines if any samples from the plurality of samples have not yet been considered. If so, illustrated processing block 224 sets a sample from the plurality of samples that is not yet considered as the selection sample. Otherwise, illustrated processing block 226 retrains the machine learning model based on the training samples while bypassing the confidence samples and the suspicious samples.

Figure 3:
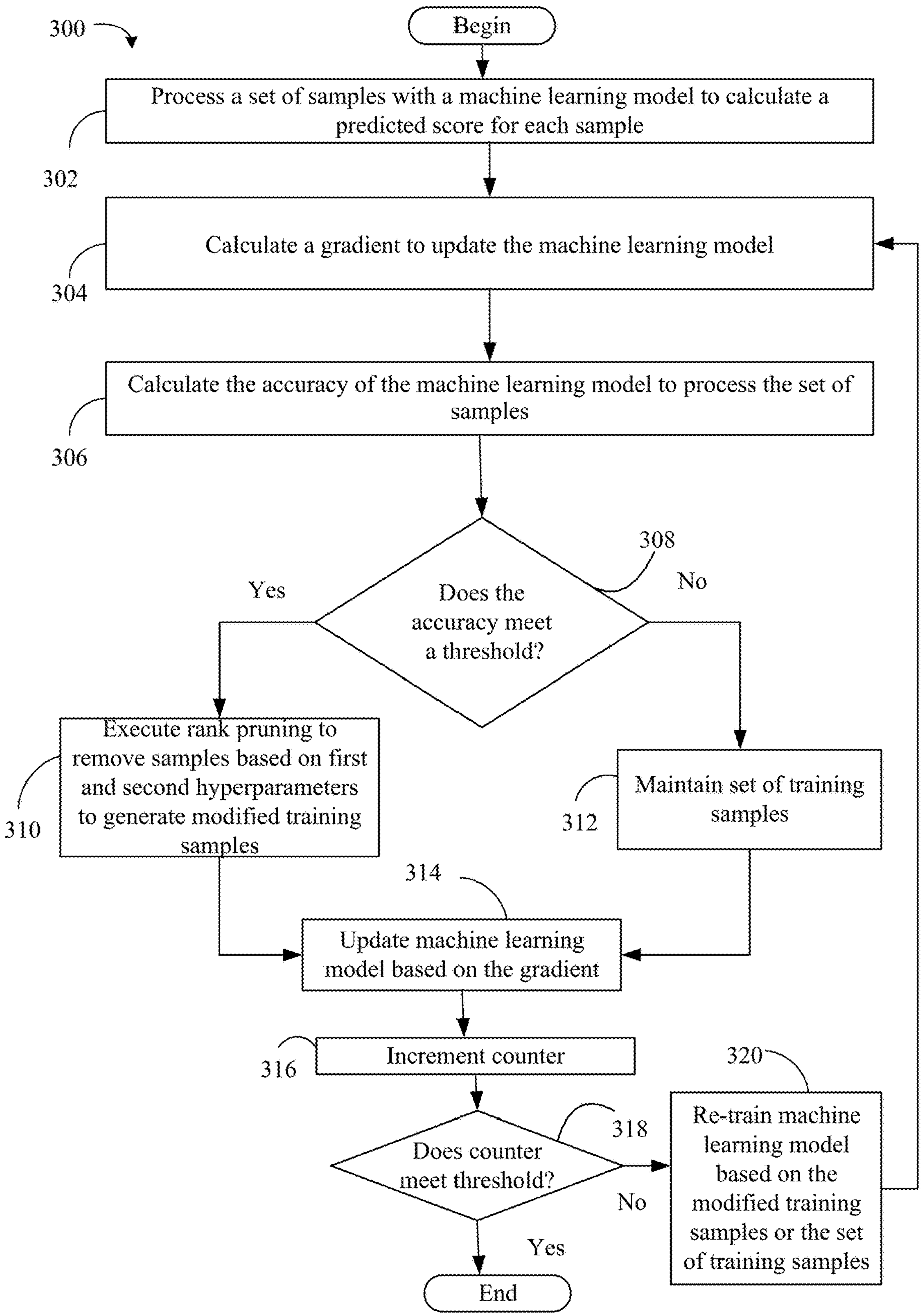
FIG. 3 is a flowchart of an example of a method to determine when to prune samples to train a machine learning model according to an example of the disclosure.

FIG. 3 illustrates a method 300 to determine when to prune samples to train a machine learning model (e.g., machine learning model). One or more aspects of method 300 may be implemented as part of and/or in conjunction with the training process 100 (FIGS. 1A, 1B and 1C) and or method 200 (FIG. 2). Method 300 may be implemented in a computing device, computing system (e.g., hardware, configurable logic, fixed-function logic hardware, at least one computer readable storage medium comprising a set of instructions for execution, etc.).

Illustrated processing block 302 processes a set of samples with a machine learning model to calculate a predicted score for each sample. Illustrated processing block 304 calculates a gradient to update the machine learning model. Illustrated processing block 306 calculates the accuracy of the machine learning model to process the set of samples. Illustrated processing block 308 determines if the accuracy meets a threshold. If so, illustrated processing block 310 executes rank pruning to remove samples based on first and second hyperparameters to generate modified training samples. Otherwise, illustrated processing block 312 maintains the set of training samples.

Illustrated processing block 314 updates the machine learning model based on the gradient. Illustrated processing block 316 increments a counter. Illustrated processing block 318 determines if the counter meets a threshold. If not, illustrated processing block 320 re-trains the machine learning model based on the modified training samples or the set of training samples. If processing block 318 determines that the counter does meet the threshold, the method 300 ends.

Figure 4:
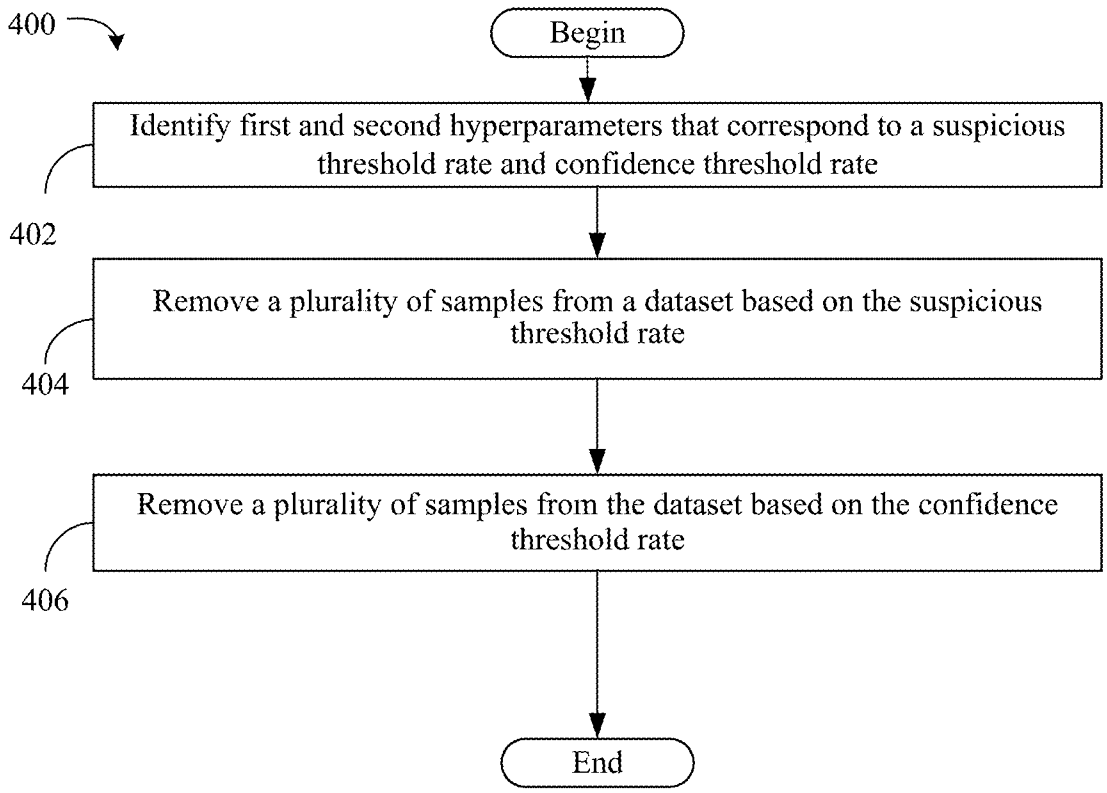
FIG. 4 is a flowchart of an example of a method to adjust first and second hyperparameters of a machine learning model according to an example of the disclosure.

FIG. 4 illustrates a method 400 to adjust first and second hyperparameters of a machine learning model (e.g., neural network). One or more aspects of method 400 may be implemented as part of and/or in conjunction with the training process 100 (FIGS. 1A, 1B and 1C), method 200 (FIG. 2) and/or method 300 (FIG. 3). Method 400 may be implemented in a computing device, computing system (e.g., hardware, configurable logic, fixed-function logic hardware, at least one computer readable storage medium comprising a set of instructions for execution, etc.).

Illustrated processing block 402 identifies first and second hyperparameters that correspond to a suspicious threshold rate and a confidence threshold rate. Illustrated processing block 404 removes a plurality of samples (e.g., noisy samples) from a dataset based on the suspicious threshold rate. For example, processing block 404 may remove a number of the noisiest samples specified by the suspicious threshold rate. Illustrated processing block 406 removes a plurality of samples (e.g., confident samples) from the dataset based on the confidence threshold rate. For example, processing block 406 may remove a number of the most confident samples specified by the confidence threshold rate.

Figure 5:
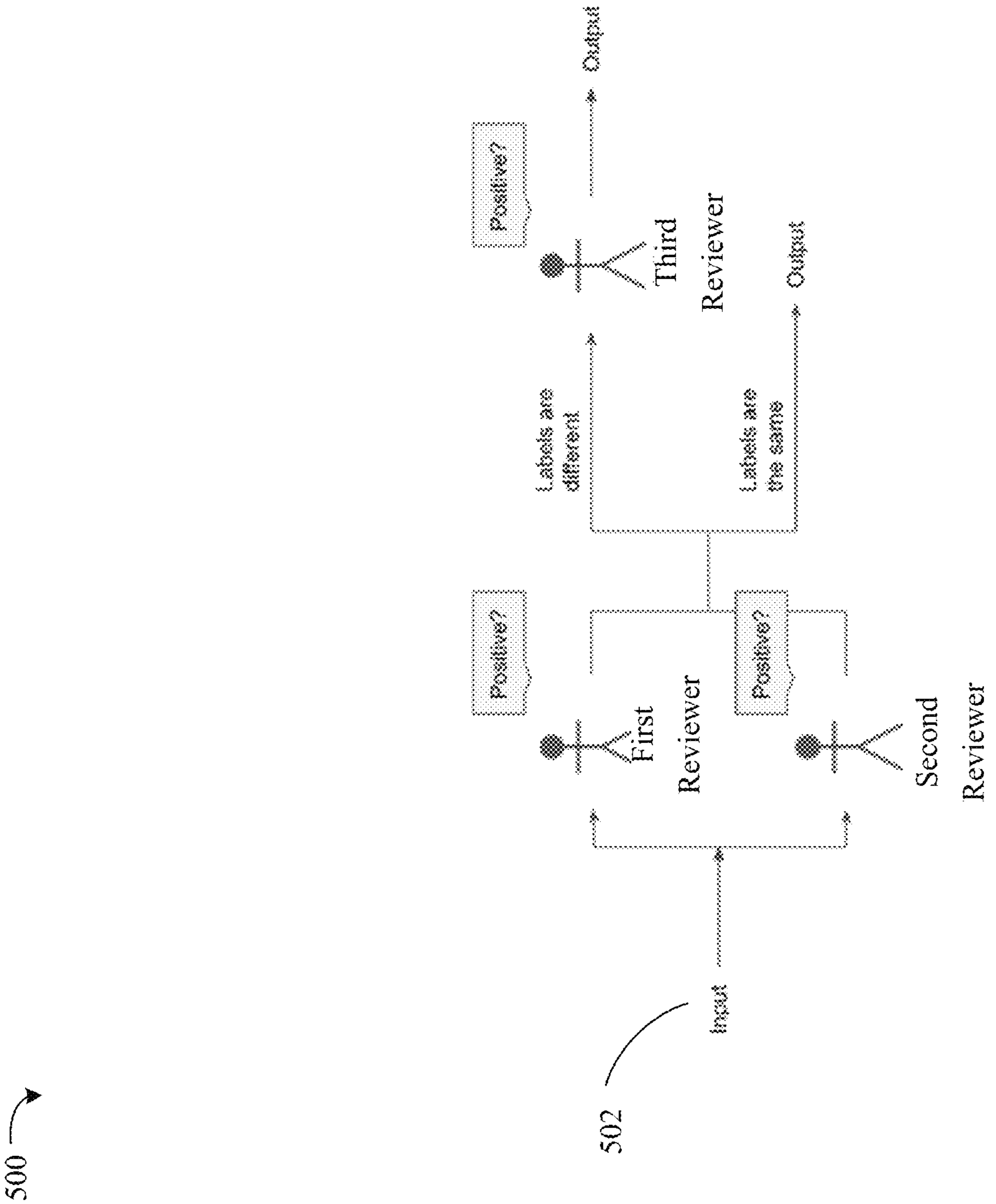
FIG. 5 is an example of a multi-person review process according to an example of the disclosure.

FIG. 5 illustrates a multi-person review process 500 to review training samples. One or more aspects of process 500 may be implemented as part of and/or in conjunction with the training process 100 (FIGS. 1A, 1B and 1C), method 200 (FIG. 2), method 300 (FIG. 3) and/or method 400 (FIG. 4).

The multi-person review process 500 may enhance the rank pruning processes described herein to generate more accurate labels. The multi-person review process 500 may be executed during the training process on erroneous samples to ensure that the erroneous samples are correctly labeled.

The analysis may be difficult when the ground truth probability $g_0$ is not 0 or 1, or the estimated model score g involves estimation error. To simplify the understanding, examples start from the simplest case (e.g., $g_0 \in \{0, 1\}$ and estimated model score $\hat{g} \equiv g_0$). Examples then extend the above to other cases to show that the multi-person review process 500 may further increase the robustness of the rank pruning algorithm. Given such enhancements in $\hat{g}$ and robustness, it is apparent that the rank pruning process benefits from the multi-person review process 500.

For example, consider the case where $g_0$ is either 0 or 1 and $\hat{g} \equiv g$. In this case, there are several changes to the data distribution and the training process. First, a larger proportion of samples have a more accurate label with less label error. Assume for each single review, $\rho_0 = \rho_1 = \rho$ for some $\rho \in [0, 0.5]$, then the probabilities of the sample being reviewed by two/three reviewers becomes $$P(\text{Three reviews}) = 2\rho(1-\rho),$$

$$P(\text{Two reviews}) = \rho^2 + (1-\rho)^2.$$

Assume the hidden true label Y=1. If a sample has three reviews, based on the multi-review process, there is still ρ probability that the final label is 0. However, when there are at most two reviews, then there is $\rho^2/(\rho^2+(1-\rho)^2)$ probability of having two labels 0, which is smaller than ρ. The overall $\tilde{\rho}$ is smaller.

Second, the consequence of a smaller $\tilde{\rho}$ is that Algorithm 2 has a more stable $\tilde{P}_{y=1}$ as the variance of $1\{z \in \tilde{P}_{y=1}\}$ is smaller. Examples omit the subscript t for $\tilde{P}_{y=1}$ to simplify the notation. Examples further assume P(Y=1)=0.5, then $$P\left(z \in \tilde{P}_{y=1} \mid \text{Three reviews}\right) = \frac{2\rho(1-\rho)^2}{2\rho(1-\rho)},$$

$$P\left(z \in \tilde{P}_{y=1} \mid \text{Two reviews}\right) = \frac{(1-\rho)^2}{\rho^2 + (1-\rho)^2},$$

where the second one$>1-\rho$.

For a random variable ξ following Bernolli distribution, the variance is $(1-\mathbb{E}\,\xi)\,\mathbb{E}\,\xi$. As a result, the binary variable $1\{z \in \tilde{P}_{y=1}\}$ has an expectation farther from 0.5, and the estimation variance becomes smaller, increasing the stability of the algorithm. Similar case happens for $N_{y=0}$ and others.

Robustness is further enhanced in the case where $\hat{g}$ is not identical to g. Examples still assume $g_0 \in \{0, 1\}$ and robustness is increased with the multi-review process. For example, a proposition (e.g., a theorem) may be provided as follows. Recall that $\Delta g(x) = \hat{g}(x) - g(x)$. Assume $g_0(x) \in \{0, 1\}$ for all $x \in D$ in the single-review process, then the following may apply:

$$\text{If } \forall\, x \in N,\ \Delta g(x) < LB_{y=1} - \rho_0, \text{ then } \hat{\rho}_{1,t} = \rho_1.$$

$$\text{If } \forall\, x \in P,\ \Delta g(x) > -(1 - \rho_1 - UB_{y=0}), \text{ then } \hat{\rho}_{0,t} = \rho_0$$

Based on the proposition, the rank pruning algorithm outputs robust $\hat{\rho}_{1,t}$ and $\hat{\rho}_{0,t}$ tolerant to the estimation error in $\hat{g}$. Examples may denote $\Gamma = \max(|LB_{y=1} - \rho_0|, |1 - \rho_1 - UB_{y=0}|)$ as the tolerance. Examples consider how the tolerance is affected when using multi-review data and get the result below in the following example.

Example 1 denotes Γ as the tolerance for single-review data and $\tilde{\Gamma}$ as the one for multi-review data. Assume $\rho_0 = \rho_1 = \rho$ for some $\rho \in [0, 0.5)$ and $\rho_{z1} = 0.5$, then $$\tilde{\Gamma} < \Gamma$$

The original ranking pruning algorithm is robust in the sense that, when $\hat{g}$ involves small errors, the estimate $\rho_0$ and $\rho_1$ are still accurate. The tolerance $\Gamma$ quantifies the robustness. When $\Delta g(x) \le \Gamma$ for any x, we have $\hat{\rho}_0 = \rho_0$ and $\hat{\rho}_1 = \rho_1$. Based on this example, when using multi-review data, the rank pruning process described herein becomes more robust.

In this example, an input 502 is provided. A first reviewer and a second reviewer classify the input 502 (e.g., positive) as having first and second labels respectively. If the first and second labels match (are the same), the matching first and second labels are output as the label of the input 502. If the labels are different, a third reviewer may classify the input 502 with a third label. If the third label matches the first label, the final output is the first label/third label. If the third label matches the second label, the final output is the first label/second label.

Figure 6:
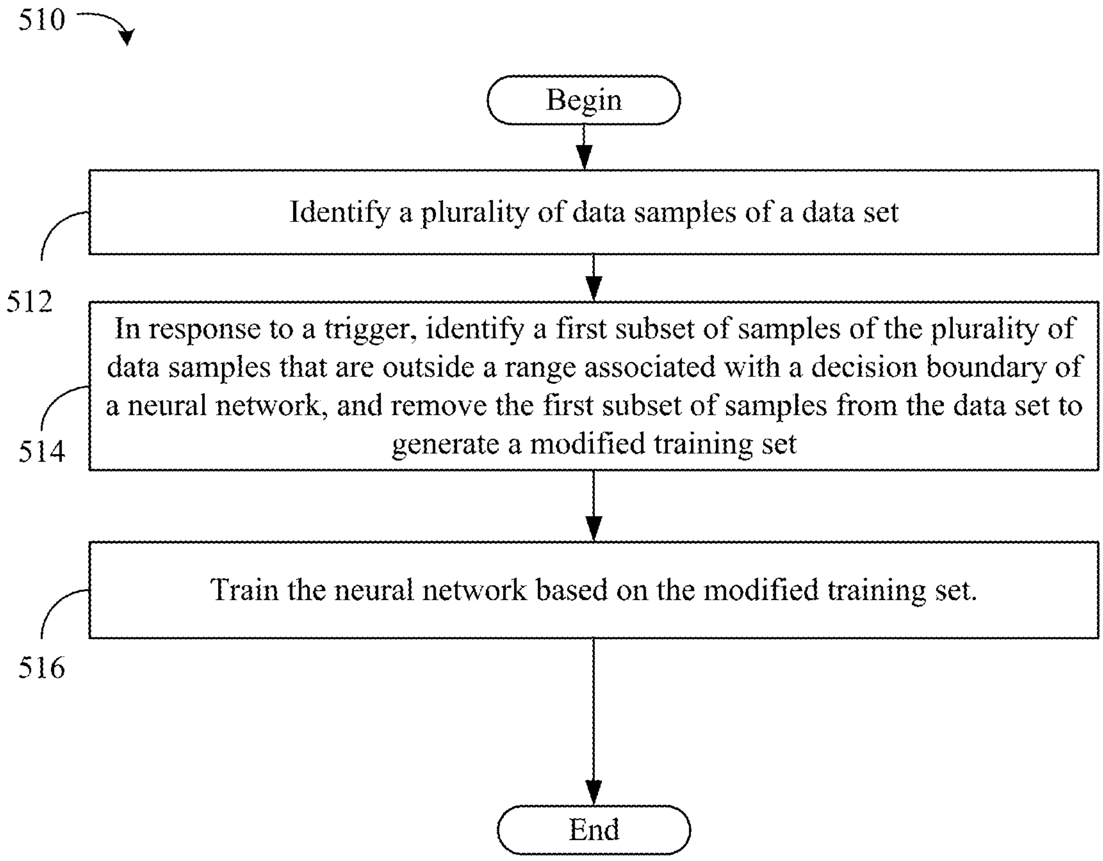
FIG. 6 is a flowchart of an example of a method to determine when to prune samples to train a machine learning model according to an example of the disclosure.

FIG. 6 illustrates a method 510 to determine when to prune samples to train a machine learning model (e.g., neural network). One or more aspects of method 300 may be implemented as part of and/or in conjunction with the training process 100 (FIGS. 1A, 1B and 1C), method 200 (FIG. 2), method 300 (FIG. 3), method 400 (FIG. 4) and/or a multi-person review process 500 (FIG. 5). Multi-person review process 500 may be implemented in a computing device, computing system (e.g., hardware, configurable logic, fixed-function logic hardware, at least one computer readable storage medium comprising a set of instructions for execution, etc.).

Illustrated processing block 512 identifies a plurality of data samples of a data set. Illustrated processing block 514 in response to a trigger, identifies a first subset of samples of the plurality of data samples that are outside a range associated with a decision boundary of a machine learning model, and removes the first subset of samples from the data set to generate a modified training set. Illustrated processing block 516 trains the machine learning model based on the modified training set.

In some examples, the method 510 includes categorizing a first sample of the first subset of samples as being a confident sample based on a label of the first sample and a classification of the first sample, and grouping the first sample into the first subset based on the first sample being categorized as being the confident sample. In such examples, to categorize the first sample of the first subset of samples as being the confident sample, the method 510 compares the label to the classification to determine that the label matches the classification.

In some examples, the method 510 includes categorizing a first sample of the first subset of samples as being a suspicious sample based on a label of the first sample and a classification of the first sample, and groups the first sample into the first subset based on the first sample being categorized as being the suspicious sample. In such examples, the method 510 includes comparing the label to the classification to determine that the label does not match the classification.

In some examples, the method 510 includes processing a set of samples with the machine learning model, determining an accuracy of the machine learning model during the processing of the set of samples, and setting the trigger based on the accuracy exceeding a threshold. In some examples, the method 510 includes bypassing a first sample of the plurality of data samples from being grouped into the first subset of samples based on a classification probability of the first sample being within the range of the decision boundary.

System Overview

Figure 7:
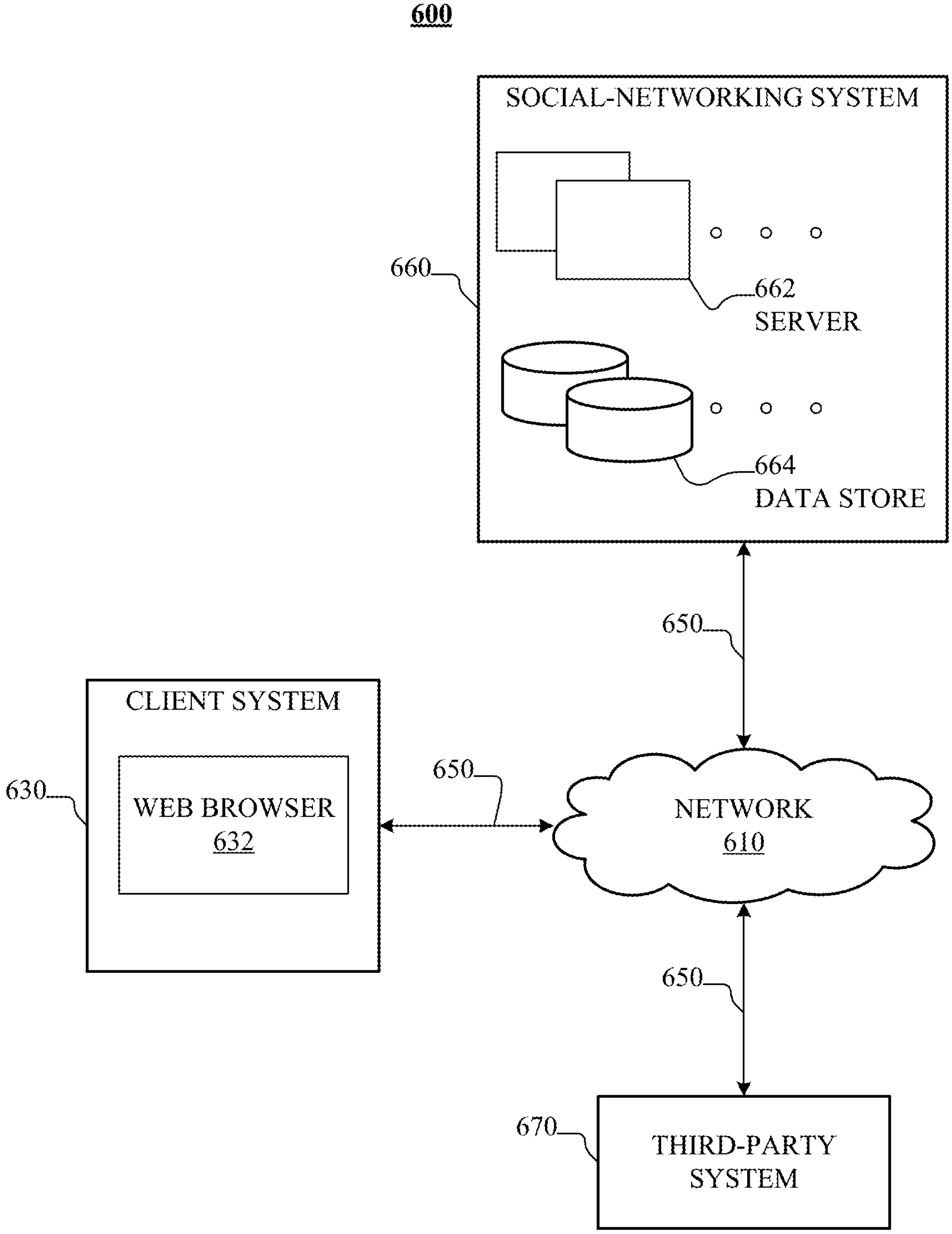
FIG. 7 illustrates an example network environment associated with a social-networking system according to an example of the disclosure.

FIG. 7 illustrates an example network environment 600 associated with a social-networking system. Network environment 600 may implement one or more aspects of the training process 100 (FIGS. 1A, 1B and 1C), method 200 (FIG. 2), method 300 (FIG. 3), method 400 (FIG. 4), a multi-person review process 500 (FIG. 5) and/or method 510 (FIG. 6) already discussed.

Network environment 600 includes a client system 630, a social-networking system 660, and a third-party system 670 connected to each other by a network 610. Although FIG. 7 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 7 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular examples, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular examples, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 may not necessarily be the same throughout network environment 600. One or more first links 650 may differ in one or more respects from one or more second links 650.

In particular examples, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular examples, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular desires. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular examples, social-networking system 660 may be a network-addressable computing system that may host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular examples, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular examples, each server 662 may include hardware, software, or embedded logic components or a combination of two or more such components for carrying out the appropriate functionalities implemented or supported by server 662. In particular examples, social-networking system 660 may include one or more data stores 664. Data stores 664 may be used to store various types of information. In particular examples, the information stored in data stores 664 may be organized according to specific data structures. In particular examples, each data store 664 may be a relational, columnar, correlation, or other suitable database. Although this disclosure describes or illustrates particular types of databases, this disclosure contemplates any suitable types of databases. Particular examples may provide interfaces that enable a client system 630, a social-networking system 660, or a third-party system 670 to manage, retrieve, modify, add, or delete, the information stored in data store 664.

In particular examples, social-networking system 660 may store one or more social graphs in one or more data stores 664. In particular examples, a social graph may include multiple nodes-which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular examples, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular examples, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular examples, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular examples, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular examples, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular examples, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular examples, social-networking system 660 also includes user-generated content objects, which may enhance a user's interactions with social-networking system 660. User-generated content may include anything a user may add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular examples, social-networking system 660 may include a variety of servers, sub-systems, programs, modules, logs, and data stores. In particular examples, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular examples, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user may be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Social Graphs

Figure 8:
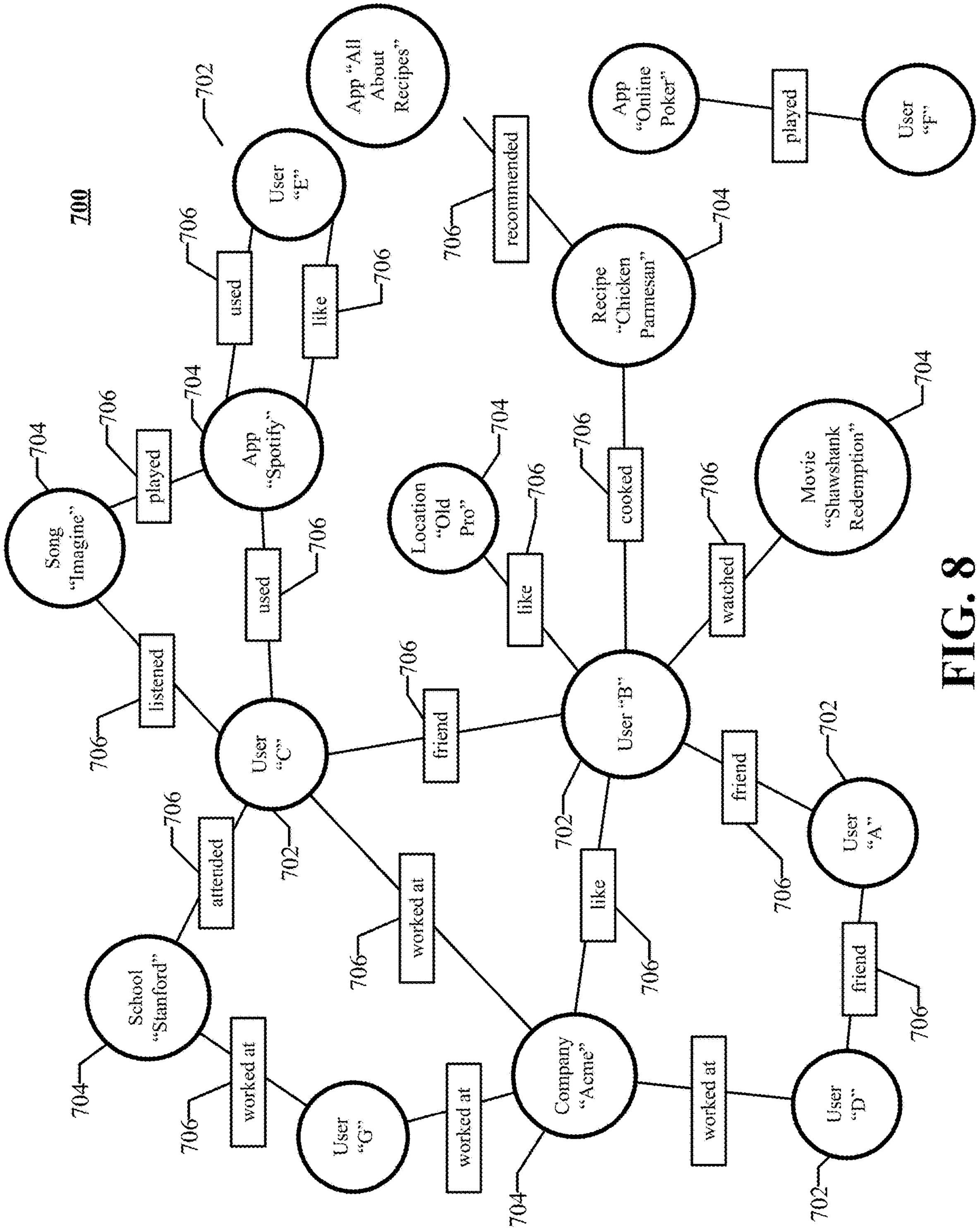
FIG. 8 illustrates an example social graph according to an example of the disclosure.

FIG. 8 illustrates example social graph 700. In some examples, the training process 100 (FIGS. 1A, 1B and 1C), method 200 (FIG. 2), method 300 (FIG. 3), method 400 (FIG. 4), the multi-person review process 500 (FIG. 5) and/or method 510 (FIG. 6) already discussed may access social graph 700 to implement one or more aspects. In particular examples, social-networking system 660 may store one or more social graphs 700 in one or more data stores. In particular examples, social graph 700 may include multiple nodes—which may include multiple user nodes 702 or multiple concept nodes 704—and multiple edges 706 connecting the nodes. Each node may be associated with a unique entity (i.e., user or concept), each of which may have a unique identifier (ID), such as a unique number or username. Example social graph 700 illustrated in FIG. 8 is shown, for didactic purposes, in a two-dimensional visual map representation. In particular examples, a social-networking system 660, client system 630, or third-party system 670 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular examples, a user node 702 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular examples, when a user registers for an account with social-networking system 660, social-networking system 660 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 660. In particular examples, a user node 702 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular examples, a user node 702 may be associated with one or more data objects corresponding to information associated with a user. In particular examples, a user node 702 may correspond to one or more webpages.

In particular examples, a concept node 704 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 704 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular examples, a concept node 704 may be associated with one or more data objects corresponding to information associated with concept node 704. In particular examples, a concept node 704 may correspond to one or more webpages.

In particular examples, a node in social graph 700 may represent or be represented by a webpage (which may be referred to as a "profile page"). Profile pages may be hosted by or accessible to social-networking system 660. Profile pages may also be hosted on third-party websites associated with a third-party system 670. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular examples, a concept node 704 may represent a third-party webpage or resource hosted by a third-party system 670. The third-party webpage or resource may include, among other elements, content, a selectable or other icon, or other inter-actable object (which may be implemented, for example, in JavaScript, AJAX, or PUP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 630 to send to social-networking system 660 a message indicating the user's action. In response to the message, social-networking system 660 may create an edge (e.g., a check-in-type edge) between a user node 702 corresponding to the user and a concept node 704 corresponding to the third-party webpage or resource and store edge 706 in one or more data stores.

In particular examples, a pair of nodes in social graph 700 may be connected to each other by one or more edges 706. An edge 706 connecting a pair of nodes may represent a relationship between the pair of nodes. In particular examples, an edge 706 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 706 connecting the first user's user node 702 to the second user's user node 702 in social graph 700 and store edge 706 as social-graph information in one or more of data stores 664. In the example of FIG. 8, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706. The degree of separation between two objects represented by two nodes, respectively, is a count of edges in a shortest path connecting the two nodes in the social graph 700. As an example and not by way of limitation, in the social graph 700, the user node 702 of user "C" is connected to the user node 702 of user "A" via multiple paths including, for example, a first path directly passing through the user node 702 of user "B," a second path passing through the concept node 704 of company "Acme" and the user node 702 of user "D," and a third path passing through the user nodes 702 and concept nodes 704 representing school "Stanford," user "G," company "Acme," and user "D." User "C" and user "A" have a degree of separation of two because the shortest path connecting their corresponding nodes (i.e., the first path) includes two edges 706.

In particular examples, an edge 706 between a user node 702 and a concept node 704 may represent a particular action or activity performed by a user associated with user node 702 toward a concept associated with a concept node 704. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 660 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social-networking system 660 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 8 between user node 702 for user "E" and concept node 704 for "SPOTIFY").

In particular examples, social-networking system 660 may create an edge 706 between a user node 702 and a concept node 704 in social graph 700. As an example and not by way of limitation, a user viewing a concept-profile page (such as, for example, by using a web browser or a special-purpose application hosted by the user's client system 630) may indicate that he or she likes the concept represented by the concept node 704 by clicking or selecting a "Like" icon, which may cause the user's client system 630 to send to social-networking system 660 a message indicating the user's liking of the concept associated with the concept-profile page. In response to the message, social-networking system 660 may create an edge 706 between user node 702 associated with the user and concept node 704, as illustrated by "like" edge 706 between the user and concept node 704.

In particular examples, social-networking system 660 may store an edge 706 in one or more data stores. In particular examples, an edge 706 may be automatically formed by social-networking system 660 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Social Graph Affinity and Coefficient

In particular examples, social-networking system 660 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 670 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular examples, social-networking system 660 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular examples, social-networking system 660 may use a variety of factors to calculate a coefficient. These factors may include, for example, user actions, types of relationships between objects, location information, other suitable factors, or any combination thereof. In particular examples, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular examples, the social-networking system 660 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular examples, social-networking system 660 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular examples, social-networking system 660 may calculate a coefficient based on a user's actions. Social-networking system 660 may monitor such actions on the online social network, on a third-party system 670, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular examples, social-networking system 660 may calculate a coefficient based on the user's actions with particular types of content. The content may be associated with the online social network, a third-party system 670, or another suitable system. The content may include users, profile pages, posts, news stories, headlines, instant messages, chat room conversations, emails, advertisements, pictures, video, music, other suitable objects, or any combination thereof. Social-networking system 660 may analyze a user's actions to determine whether one or more of the actions indicate an affinity for subject matter, content, other users, and so forth. As an example and not by way of limitation, if a user frequently posts content related to "coffee" or variants thereof, social-networking system 660 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular examples, social-networking system 660 may calculate a coefficient based on the type of relationship between particular objects. Referencing the social graph 700, social-networking system 660 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than user nodes 702 that are connected by a friend-type edge. In other words, depending upon the weights assigned to the actions and relationships for the particular user, the overall affinity may be determined to be higher for content about the user's spouse than for content about the user's friend. In particular examples, the relationships a user has with another object may affect the weights and/or the ratings of the user's actions with respect to calculating the coefficient for that object. As an example and not by way of limitation, if a user is tagged in a first photo, but merely likes a second photo, social-networking system 660 may determine that the user has a higher coefficient with respect to the first photo than the second photo because having a tagged-in-type relationship with content may be assigned a higher weight and/or rating than having a like-type relationship with content. In particular examples, social-networking system 660 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 660 may determine that the first user should also have a relatively high coefficient for the particular object. In particular examples, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (i.e., fewer degrees of separation) may have a higher coefficient than entities that are further apart in the social graph 700.

In particular examples, social-networking system 660 may calculate a coefficient based on location information. Objects that are geographically closer to each other may be considered to be more related or of more interest to each other than more distant objects. In particular examples, the coefficient of a user towards a particular object may be based on the proximity of the object's location to a current location associated with the user (or the location of a client system 630 of the user). A first user may be more interested in other users or concepts that are closer to the first user. As an example and not by way of limitation, if a user is one mile from an airport and two miles from a gas station, social-networking system 660 may determine that the user has a higher coefficient for the airport than the gas station based on the proximity of the airport to the user.

In particular examples, social-networking system 660 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 660 may provide information that is relevant to user's interests and current circumstances, increasing the likelihood that they will find such information of interest. In particular examples, social-networking system 660 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular examples, social-networking system 660 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular examples, social-networking system 660 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 670 (e.g., via an API or other communication channel), or from another suitable system. In response to the request, social-networking system 660 may calculate the coefficient (or access the coefficient information if it has previously been calculated and stored). In particular examples, social-networking system 660 may measure an affinity with respect to a particular process. Different processes (both internal and external to the online social network) may request a coefficient for a particular object or set of objects. Social-networking system 660 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular examples may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular examples, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) may be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular examples, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular examples, privacy settings may be associated with particular social-graph elements. Privacy settings of a social-graph element, such as a node or an edge, may specify how the social-graph element, information associated with the social-graph element, or content objects associated with the social-graph element may be accessed using the online social network. As an example and not by way of limitation, a particular concept node 704 corresponding to a particular photo may have a privacy setting specifying that the photo may be accessed by users tagged in the photo and their friends. In particular examples, privacy settings may allow users to opt in or opt out of having their actions logged by social-networking system 660 or shared with other systems (e.g., third-party system 670). In particular examples, the privacy settings associated with an object may specify any suitable granularity of permitted access or denial of access. As an example and not by way of limitation, access or denial of access may be specified for particular users (e.g., me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 670, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular examples, one or more servers 662 may be authorization/privacy servers for enforcing privacy settings. In response to a request from a user (or other entity) for a particular object stored in a data store 664, social-networking system 660 may send a request to the data store 664 for the object. The request may identify the user associated with the request and may be sent to the user (or a client system 630 of the user) if the authorization server determines that the user is authorized to access the object based on the privacy settings associated with the object. If the requesting user is not authorized to access the object, the authorization server may prevent the requested object from being retrieved from the data store 664, or may prevent the requested object from being sent to the user. In the search query context, an object may be generated as a search result if the querying user is authorized to access the object. In other words, the object may have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 9:
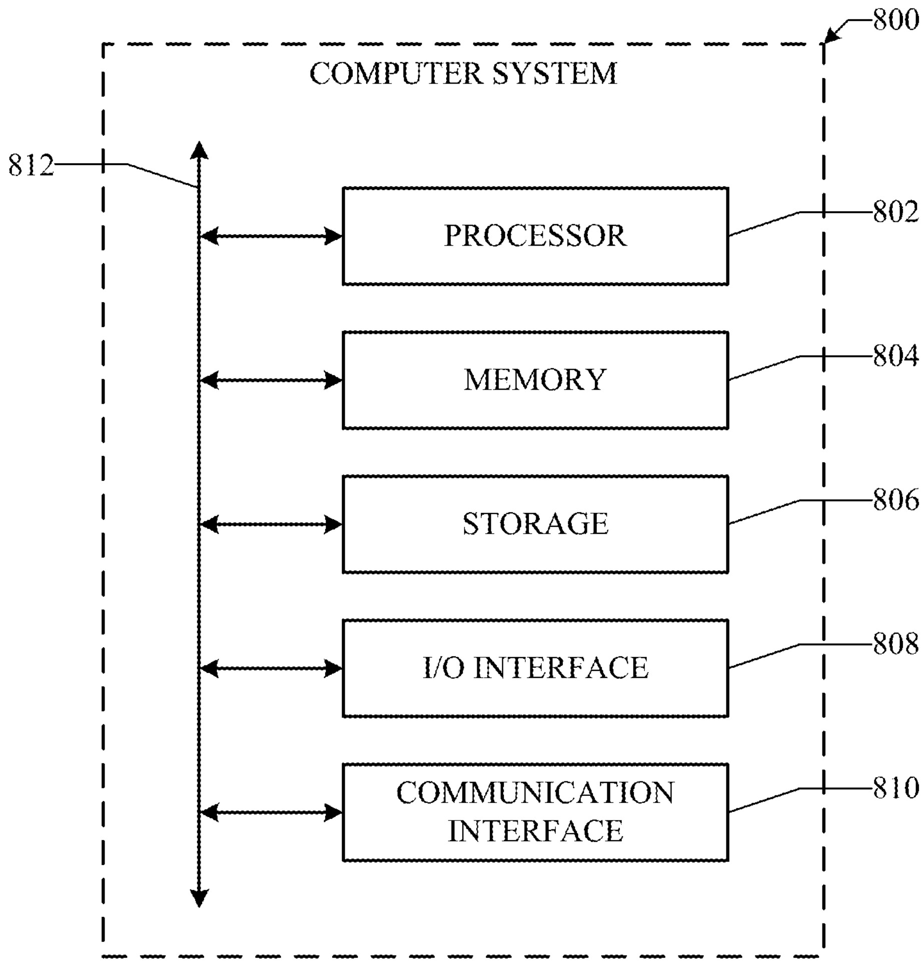
FIG. 9 illustrates an example computer system according to an example of the disclosure.

FIG. 9 illustrates an example computer system 800. The system 800 may implement one or more aspects of the training process 100 (FIGS. 1A, 1B and 1C), method 200 (FIG. 2), method 300 (FIG. 3), method 400 (FIG. 4), a multi-person review process 500 (FIG. 5) and/or method 510 (FIG. 6). In particular examples, one or more computer systems 800 perform one or more steps of one or more methods described or illustrated herein. In particular examples, one or more computer systems 800 provide functionality described or illustrated herein. In particular examples, software running on one or more computer systems 800 performs one or more steps of one or more methods described or illustrated herein or provides functionality described or illustrated herein. Particular examples include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular examples, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular examples, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular examples, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular examples, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular examples, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular examples, processor 802 executes instructions in one or more internal registers or internal caches or in memory 804 (as opposed to storage 806 or elsewhere) and operates on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular examples, one or more memory management units (MMUs) reside between processor 802 and memory 804 and facilitate accesses to memory 804 requested by processor 802. In particular examples, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular examples, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular examples, storage 806 is non-volatile, solid-state memory. In particular examples, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular examples, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular examples, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular examples, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

EXAMPLES

Example 1 includes at least one computer readable storage medium comprising a set of instructions, which when executed by a computing device, cause the computing device to identify a plurality of data samples of a data set, in response to a trigger, identify a first subset of samples of the plurality of data samples that are outside a range associated with a decision boundary of a machine learning model, and remove the first subset of samples from the data set to generate a modified training set, and train the machine learning model based on the modified training set.

Example 2 includes the at least one computer readable storage medium of Example 1, wherein the instructions, when executed, cause the computing device to categorize a first sample of the first subset of samples as being a confident sample based on a label of the first sample and a classification of the first sample, and group the first sample into the first subset based on the first sample being categorized as being the confident sample.

Example 3 includes the at least one computer readable storage medium of Example 2, wherein to categorize the first sample of the first subset of samples as being the confident sample, the instructions, when executed, cause the computing device to compare the label to the classification to determine that the label matches the classification.

Example 4 includes the at least one computer readable storage medium of Example 1, wherein the instructions, when executed, cause the computing device to categorize a first sample of the first subset of samples as being a suspicious sample based on a label of the first sample and a classification of the first sample, and group the first sample into the first subset based on the first sample being categorized as being the suspicious sample.

Example 5 includes the at least one computer readable storage medium of Example 4, wherein to categorize the first sample as being the suspicious sample, the instructions, when executed, cause the computing device to compare the label to the classification to determine that the label does not match the classification.

Example 6 includes the at least one computer readable storage medium of any one of Examples 1 to 5, wherein the instructions, when executed, cause the computing device to process a set of samples with the machine learning model, determine an accuracy of the machine learning model during the processing of the set of samples, and set the trigger based on the accuracy exceeding a threshold.

Example 7 includes the at least one computer readable storage medium of any one of Examples 1 to 6, wherein the instructions, when executed, cause the computing device to bypass a bypass sample of the plurality of data samples from being grouped into the first subset of samples based on a classification probability of the bypass sample being within the range of the decision boundary.

Example 8 includes a system comprising one or more processors, and a memory coupled to the one or more processors, the memory comprising instructions executable by the one or more processors, the one or more processors being operable when executing the instructions to identify a plurality of data samples of a data set, in response to a trigger, identify a first subset of samples of the plurality of data samples that are outside a range associated with a decision boundary of a machine learning model, and remove the first subset of samples from the data set to generate a modified training set, and train the machine learning model based on the modified training set.

Example 9 includes the system of Example 8, wherein the one or more processors are further operable when executing the instructions to categorize a first sample of the first subset of samples as being a confident sample based on a label of the first sample and a classification of the first sample, and group the first sample into the first subset based on the first sample being categorized as being the confident sample.

Example 10 includes the system of Example 9, wherein to categorize the first sample of the first subset of samples as being the confident sample, the one or more processors are further operable when executing the instructions to compare the label to the classification to determine that the label matches the classification.

Example 11 includes the system of Example 8, wherein the one or more processors are further operable when executing the instructions to categorize a first sample of the first subset of samples as being a suspicious sample based on a label of the first sample and a classification of the first sample, and group the first sample into the first subset based on the first sample being categorized as being the suspicious sample.

Example 12 includes the system of Example 11, wherein to categorize the first sample as being the suspicious sample, the one or more processors are further operable when executing the instructions to compare the label to the classification to determine that the label does not match the classification.

Example 13 includes the system of any one of Examples 8 to 12, wherein the one or more processors are further operable when executing the instructions to process a set of samples with the machine learning model, determine an accuracy of the machine learning model during the processing of the set of samples, and set the trigger based on the accuracy exceeding a threshold.

Example 14 includes the system of any one of Examples 8 to 13, wherein the one or more processors are further operable when executing the instructions to bypass a bypass sample of the plurality of data samples from being grouped into the first subset of samples based on a classification probability of the bypass sample being within the range of the decision boundary.

Example 15 includes a method comprising identifying a plurality of data samples of a data set, in response to a trigger, identifying a first subset of samples of the plurality of data samples that are outside a range associated with a decision boundary of a machine learning model, and removing the first subset of samples from the data set to generate a modified training set, and training the machine learning model based on the modified training set.

Example 16 includes the method of Example 15, further comprising categorizing a first sample of the first subset of samples as being a confident sample based on a label of the first sample and a classification of the first sample, and grouping the first sample into the first subset based on the first sample being categorized as being the confident sample.

Example 17 includes the method of Example 16, wherein the categorizing the first sample further comprises comparing the label to the classification to determine that the label matches the classification.

Example 18 includes the method of Example 15, further comprising categorizing a first sample of the first subset of samples as being a suspicious sample based on a label of the first sample and a classification of the first sample, and grouping the first sample into the first subset based on the first sample being categorized as being the suspicious sample.

Example 19 includes the method of Example 18, wherein the categorizing the first sample as being the suspicious sample comprises comparing the label to the classification to determine that the label does not match the classification.

Example 20 includes the method of any one of Examples 15 to 19, further comprising processing a set of samples with the machine learning model, determining an accuracy of the machine learning model during the processing of the set of samples, setting the trigger based on the accuracy exceeding a threshold, and bypassing a bypass sample of the plurality of data samples from being grouped into the first subset of samples based on a classification probability of the bypass sample being within the range of the decision boundary.

Example 21 includes a apparatus comprising means for identifying a plurality of data samples of a data set, in response to a trigger, means for identifying a first subset of samples of the plurality of data samples that are outside a range associated with a decision boundary of a machine learning model, and means for removing the first subset of samples from the data set to generate a modified training set, and means for training the machine learning model based on the modified training set.

Example 22 includes the apparatus of Example 21, further comprising means for categorizing a first sample of the first subset of samples as being a confident sample based on a label of the first sample and a classification of the first sample, and means for grouping the first sample into the first subset based on the first sample being categorized as being the confident sample.

Example 23 includes the apparatus of Example 22, wherein the means for categorizing the first sample of the first subset of samples as being the confident sample comprises means for comparing the label to the classification to determine that the label matches the classification.

Example 24 includes the apparatus of Example 21, further comprising means for categorizing a first sample of the first subset of samples as being a suspicious sample based on a label of the first sample and a classification of the first sample, and means for grouping the first sample into the first subset based on the first sample being categorized as being the suspicious sample.

Example 25 includes the apparatus of Example 24, wherein the means for categorizing the first sample as being the suspicious sample comprises means for comparing the label to the classification to determine that the label does not match the classification.

Example 26 includes the apparatus of any one of Examples 21 to 25, further comprising means for processing a set of samples with the machine learning model, means for determining an accuracy of the machine learning model during the processing of the set of samples, and means for setting the trigger based on the accuracy exceeding a threshold.

Example 27 includes the apparatus of any one of Examples 21 to 26, further comprising means for bypassing a bypass sample of the plurality of data samples from being grouped into the first subset of samples based on a classification probability of the bypass sample being within the range of the decision boundary.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Examples are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary examples to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although examples are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the examples. Further, arrangements may be shown in block diagram form in order to avoid obscuring examples, and also in view of the fact that specifics with respect to implementation of such block diagram arrangements are highly dependent upon the computing system within which the example is to be implemented, i.e., such specifics should be well within purview of one skilled in the art. Where specific details (e.g., circuits) are set forth in order to describe example examples, it should be apparent to one skilled in the art that examples may be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the examples may be implemented in a variety of forms. Therefore, while the examples have been described in connection with particular examples thereof, the true scope of the examples should not be so limited since other modifications will become apparent to the skilled practitioner upon a study of the drawings, specification, and following claims.

We claim:

1. At least one computer readable storage medium comprising a set of instructions, which when executed by a computing device, cause the computing device to:

identify a plurality of data samples of a data set;

in response to a trigger, identify a first subset of samples of the plurality of data samples that are outside a range associated with a decision boundary of a machine learning model;

categorize a first sample of the first subset of samples as being a confident sample based on a label of the first sample and a classification of the first sample;

determine that the first sample is outside the range associated with the decision boundary;

group the first sample into the first subset based at least in part on the first sample being categorized as a confident sample that is determined to be outside the range associated with the decision boundary; and remove the first subset of samples from the data set to generate a modified training set; and train the machine learning model based on the modified training set.

2. The at least one computer readable storage medium of claim 1, wherein to categorize the first sample of the first subset of samples as being the confident sample, the instructions, when executed, cause the computing device to:

compare the label to the classification to determine that the label matches the classification.

3. The at least one computer readable storage medium of claim 1, wherein the instructions, when executed, cause the computing device to:

categorize a first sample of the first subset of samples as being a suspicious sample based on a label of the first sample and a classification of the first sample; and group the first sample into the first subset based on the first sample being categorized as being the suspicious sample.

4. The at least one computer readable storage medium of claim 3, wherein to categorize the first sample as being the suspicious sample, the instructions, when executed, cause the computing device to:

compare the label to the classification to determine that the label does not match the classification.

5. The at least one computer readable storage medium of claim 1, wherein the instructions, when executed, cause the computing device to:

process a set of samples with the machine learning model;

determine an accuracy of the machine learning model during the processing of the set of samples; and set the trigger based on the accuracy exceeding a threshold.

6. The at least one computer readable storage medium of claim 1, wherein the instructions, when executed, cause the computing device to:

bypass a bypass sample of the plurality of data samples from being grouped into the first subset of samples based on a classification probability of the bypass sample being within the range of the decision boundary.

7. A system comprising:

one or more processors; and a memory coupled to the one or more processors, the memory comprising instructions executable by the one or more processors, the one or more processors being operable when executing the instructions to:

identify a plurality of data samples of a data set;

in response to a trigger, identify a first subset of samples of the plurality of data samples that are outside a range associated with a decision boundary of a machine learning model;

categorize a first sample of the first subset of samples as being a confident sample based on a label of the first sample and a classification of the first sample;

determine that the first sample is outside the range associated with the decision boundary;

group the first sample into the first subset based at least in part on the first sample being categorized as a confident sample that is determined to be outside the range associated with the decision boundary; and remove the first subset of samples from the data set to generate a modified training set; and train the machine learning model based on the modified training set.

8. The system of claim 7, wherein to categorize the first sample of the first subset of samples as being the confident sample, the one or more processors are further operable when executing the instructions to:

compare the label to the classification to determine that the label matches the classification.

9. The system of claim 7, wherein the one or more processors are further operable when executing the instructions to:

categorize a first sample of the first subset of samples as being a suspicious sample based on a label of the first sample and a classification of the first sample; and group the first sample into the first subset based on the first sample being categorized as being the suspicious sample.

10. The system of claim 9, wherein to categorize the first sample as being the suspicious sample, the one or more processors are further operable when executing the instructions to:

compare the label to the classification to determine that the label does not match the classification.

11. The system of claim 7, wherein the one or more processors are further operable when executing the instructions to:

process a set of samples with the machine learning model;

determine an accuracy of the machine learning model during the processing of the set of samples; and set the trigger based on the accuracy exceeding a threshold.

12. The system of claim 7, wherein the one or more processors are further operable when executing the instructions to:

bypass a bypass sample of the plurality of data samples from being grouped into the first subset of samples based on a classification probability of the bypass sample being within the range of the decision boundary.

13. A method comprising:

identifying a plurality of data samples of a data set;

in response to a trigger, identifying a first subset of samples of the plurality of data samples that are outside a range associated with a decision boundary of a machine learning model;

categorize a first sample of the first subset of samples as being a confident sample based on a label of the first sample and a classification of the first sample;

determine that the first sample is outside the range associated with the decision boundary;

group the first sample into the first subset based at least in part on the first sample being categorized as a confident sample that is determined to be outside the range associated with the decision boundary; and removing the first subset of samples from the data set to generate a modified training set; and training the machine learning model based on the modified training set.

14. The method of claim 13, wherein the categorizing the first sample further comprises:

comparing the label to the classification to determine that the label matches the classification.

15. The method of claim 13, further comprising:

categorizing a first sample of the first subset of samples as being a suspicious sample based on a label of the first sample and a classification of the first sample; and grouping the first sample into the first subset based on the first sample being categorized as being the suspicious sample.

16. The method of claim 15, wherein the categorizing the first sample as being the suspicious sample comprises: comparing the label to the classification to determine that the label does not match the classification.

17. The method of claim 13, further comprising:

processing a set of samples with the machine learning model;

determining an accuracy of the machine learning model during the processing of the set of samples;

setting the trigger based on the accuracy exceeding a threshold; and bypassing a bypass sample of the plurality of data samples from being grouped into the first subset of samples based on a classification probability of the bypass sample being within the range of the decision boundary.

* * * * *